(12) United States Patent
Mizumori et al.

(10) Patent No.: US 11,356,592 B2
(45) Date of Patent: Jun. 7, 2022

(54) IMAGE PROCESSING APPARATUS AND CONTROL METHOD THEREOF

(71) Applicant: CANON KABUSHIKI KAISHA, Tokyo (JP)

(72) Inventors: Ryuta Mizumori, Kanagawa (JP); Takeshi Shinomiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 17/143,440

(22) Filed: Jan. 7, 2021

(65) Prior Publication Data

US 2021/0218880 A1    Jul. 15, 2021

(30) Foreign Application Priority Data

Jan. 15, 2020  (JP) .............................. JP2020-004670

(51) Int. Cl.
*H04N 5/232*  (2006.01)
*H04L 67/06*  (2022.01)
*H04N 5/357*  (2011.01)
*H04N 5/235*  (2006.01)

(52) U.S. Cl.
CPC ......... *H04N 5/23206* (2013.01); *H04L 67/06* (2013.01); *H04N 5/2355* (2013.01); *H04N 5/3572* (2013.01)

(58) Field of Classification Search
CPC ............. H04N 5/23206; H04N 5/3572; H04N 5/2355; H04N 5/23229; H04N 5/217; H04L 67/06
See application file for complete search history.

(56) References Cited

U.S. PATENT DOCUMENTS

| 10,678,837 | B2* | 6/2020 | Fieglein | G06Q 30/0268 |
| 2006/0142059 | A1* | 6/2006 | Ishiguro | H04N 1/00244 |
| | | | | 455/556.1 |
| 2016/0057310 | A1* | 2/2016 | Hitaka | H04N 1/00244 |
| | | | | 348/207.1 |
| 2019/0286895 | A1* | 9/2019 | Zakharov | G06K 9/183 |

FOREIGN PATENT DOCUMENTS

JP    2009-044256 A    2/2009

* cited by examiner

*Primary Examiner* — Yogesh K Aggarwal
(74) *Attorney, Agent, or Firm* — Cowan, Liebowitz & Latman, P.C.

(57) ABSTRACT

An image processing apparatus comprises a communication unit configured to communicate with an external apparatus, an image processing unit configured to perform first image processing on first image data, and a control unit configured to transmit a request for executing second image processing which is different from the first image processing on the first image data to the external apparatus via the communication unit, and receive second image data on which the second image processing has been executed from the external apparatus via the communication unit. In response that a function of the second image processing executable in the external apparatus is updated, the control unit determines whether to transmit a request again for executing the second image processing to the external apparatus.

14 Claims, 18 Drawing Sheets

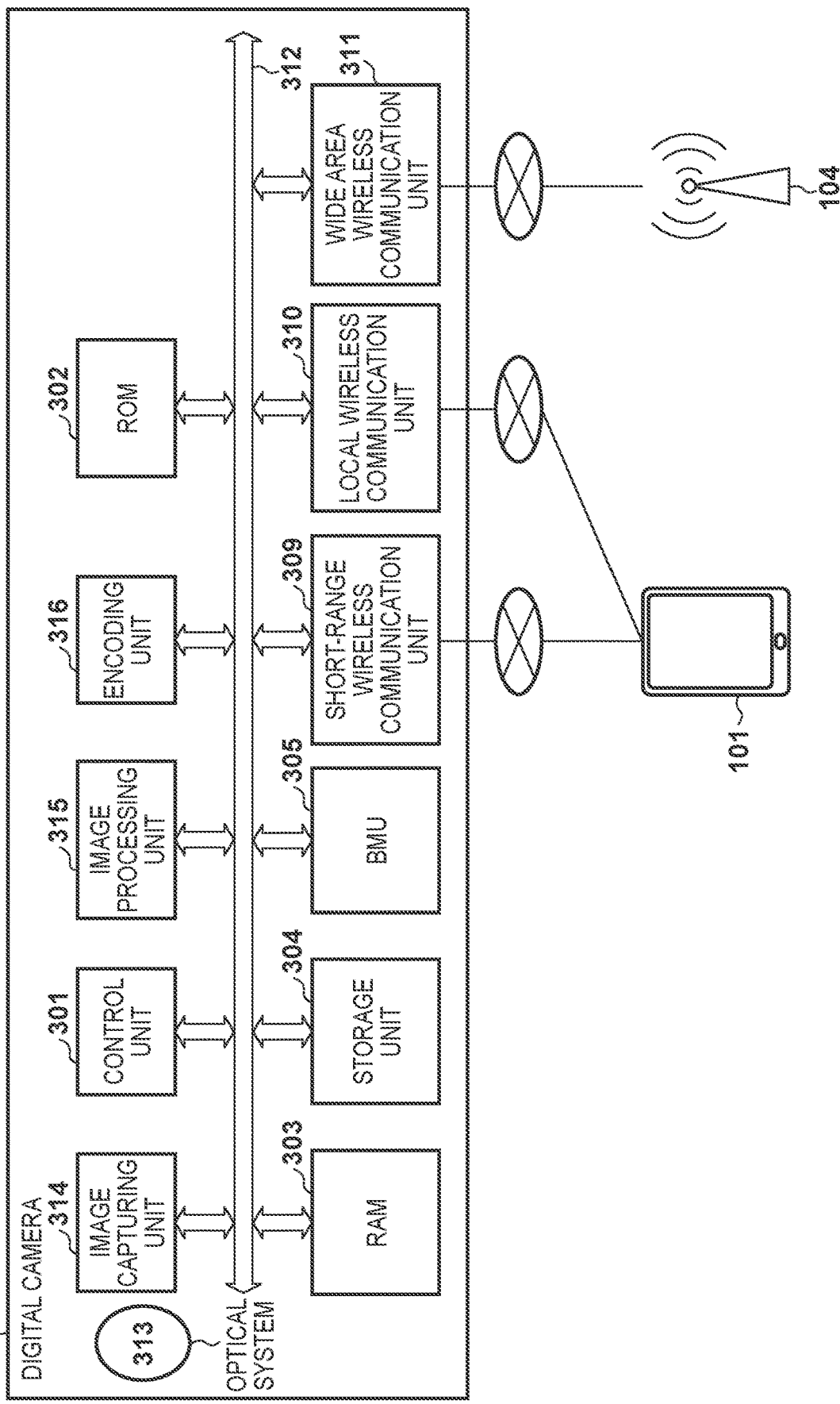

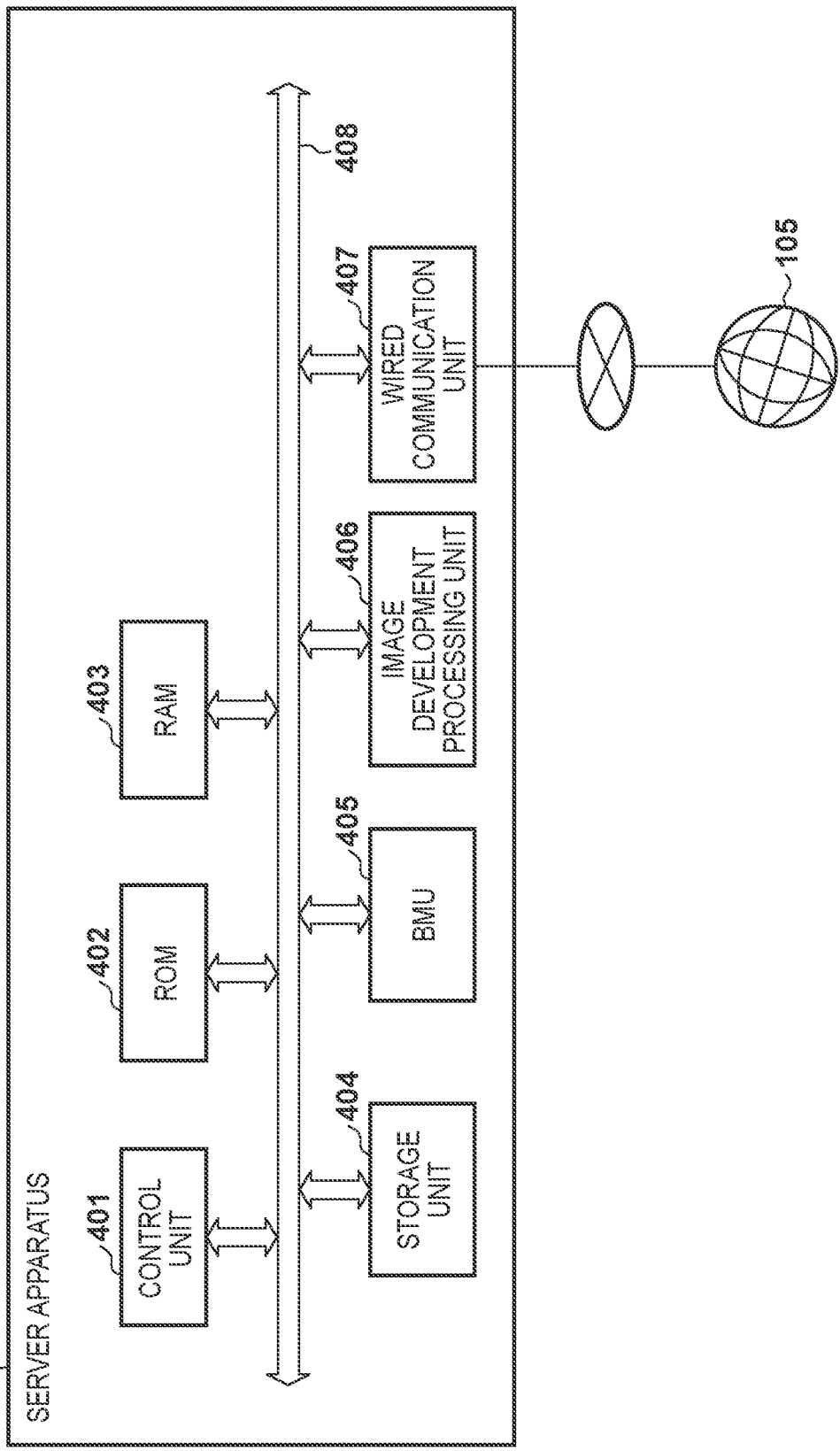

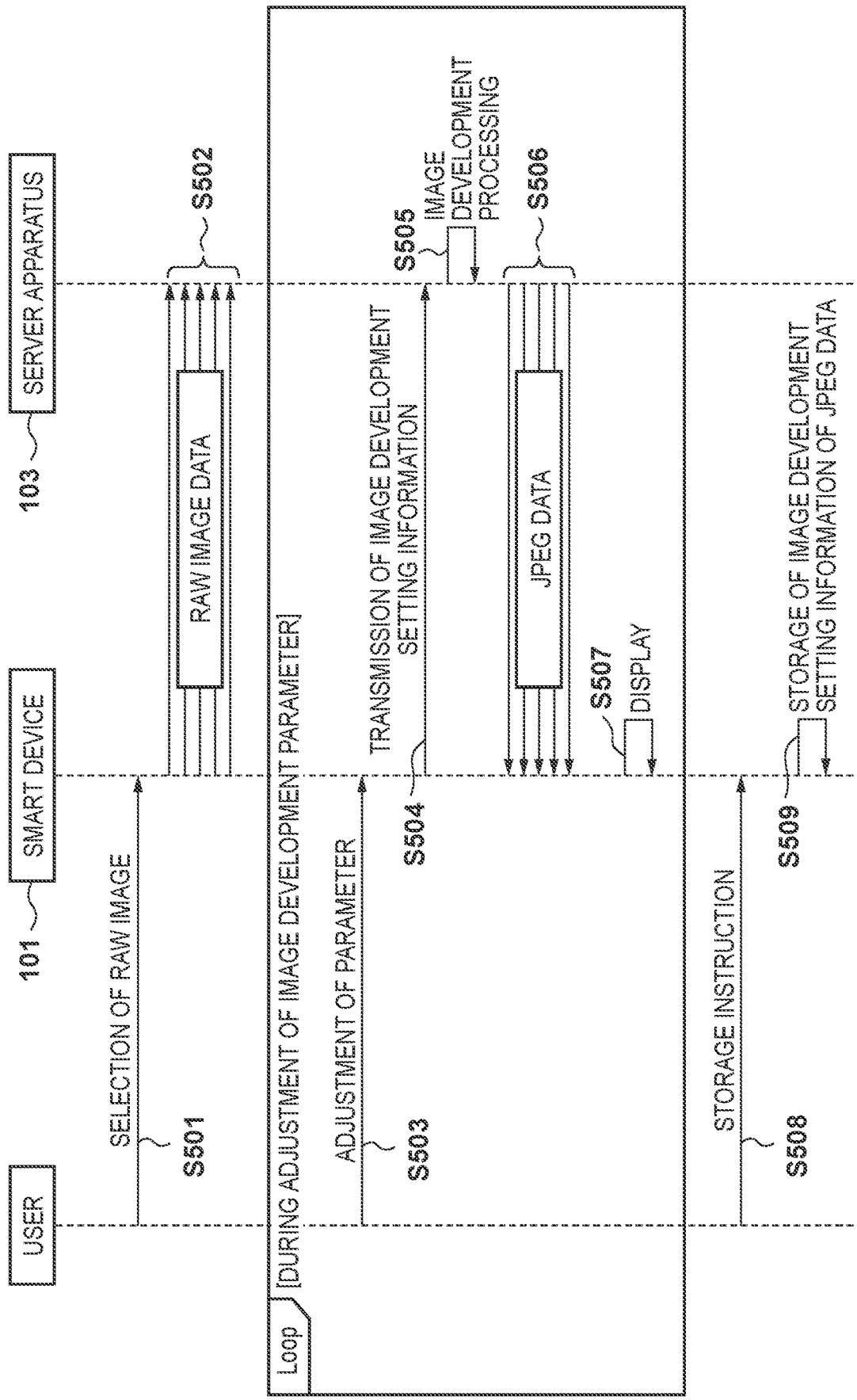

| ID | UPDATE CONTENT | |
|---|---|---|
| | UPDATE INFORMATION OF IMAGE DEVELOPMENT FUNCTION(Version2.0.1) | |
| 1 | LENS CORRECTION FUNCTION (COUNTERMEASURE OF LENS CORRECTION) | 1993 MODEL EF28-70mm F2.8L USM |
| | | 1987 MODEL EF50mm F2.5 COMPACT MACRO |
| | | 1995 MODEL EF80-200mm F4.5-5.6 II |
| | | 1997 MODEL EF300mm F4L USM |
| 2 | NOISE REDUCTION FUNCTION (IMPROVEMENT OF NOISE REDUCTION ALGORITHM) | |

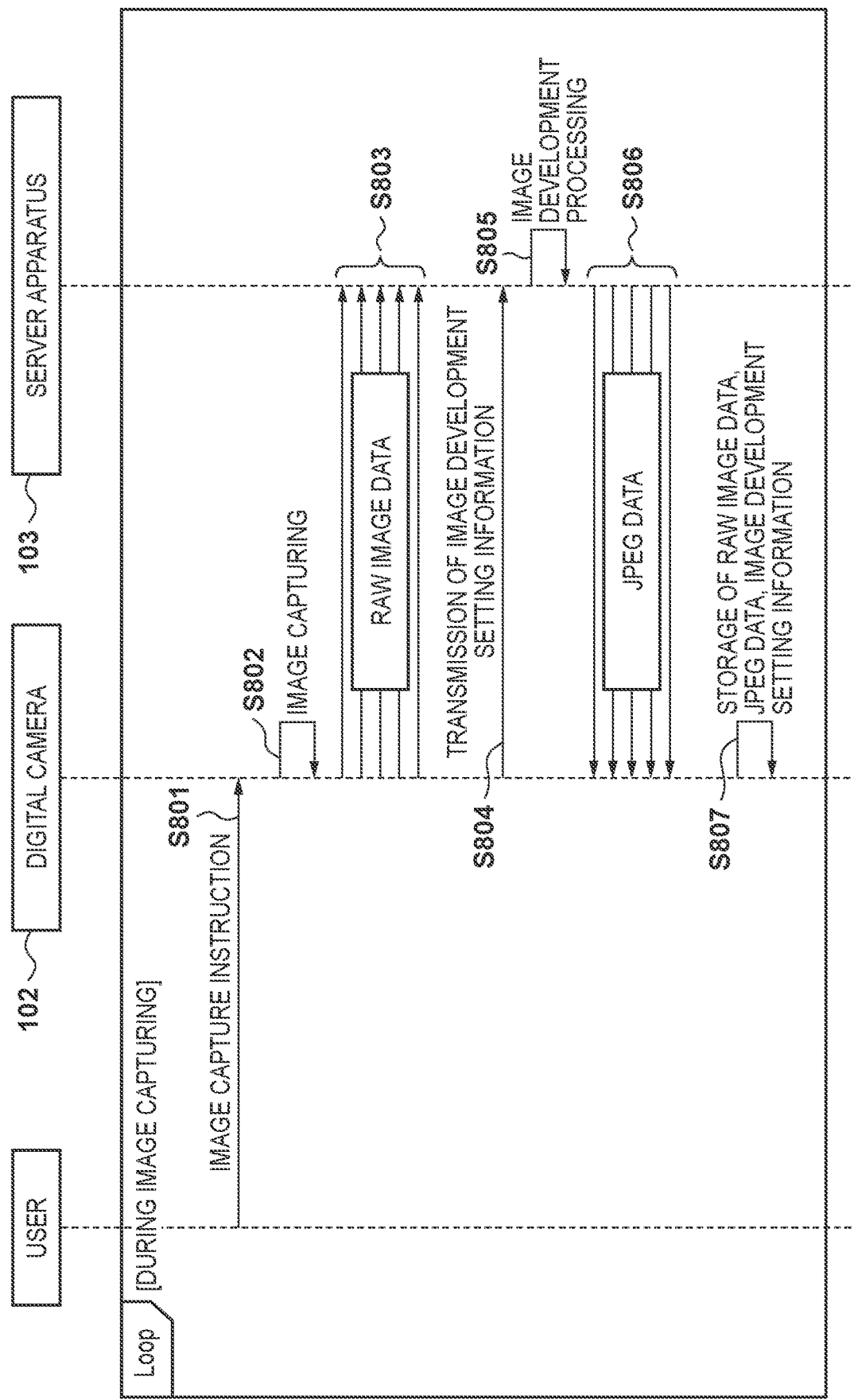

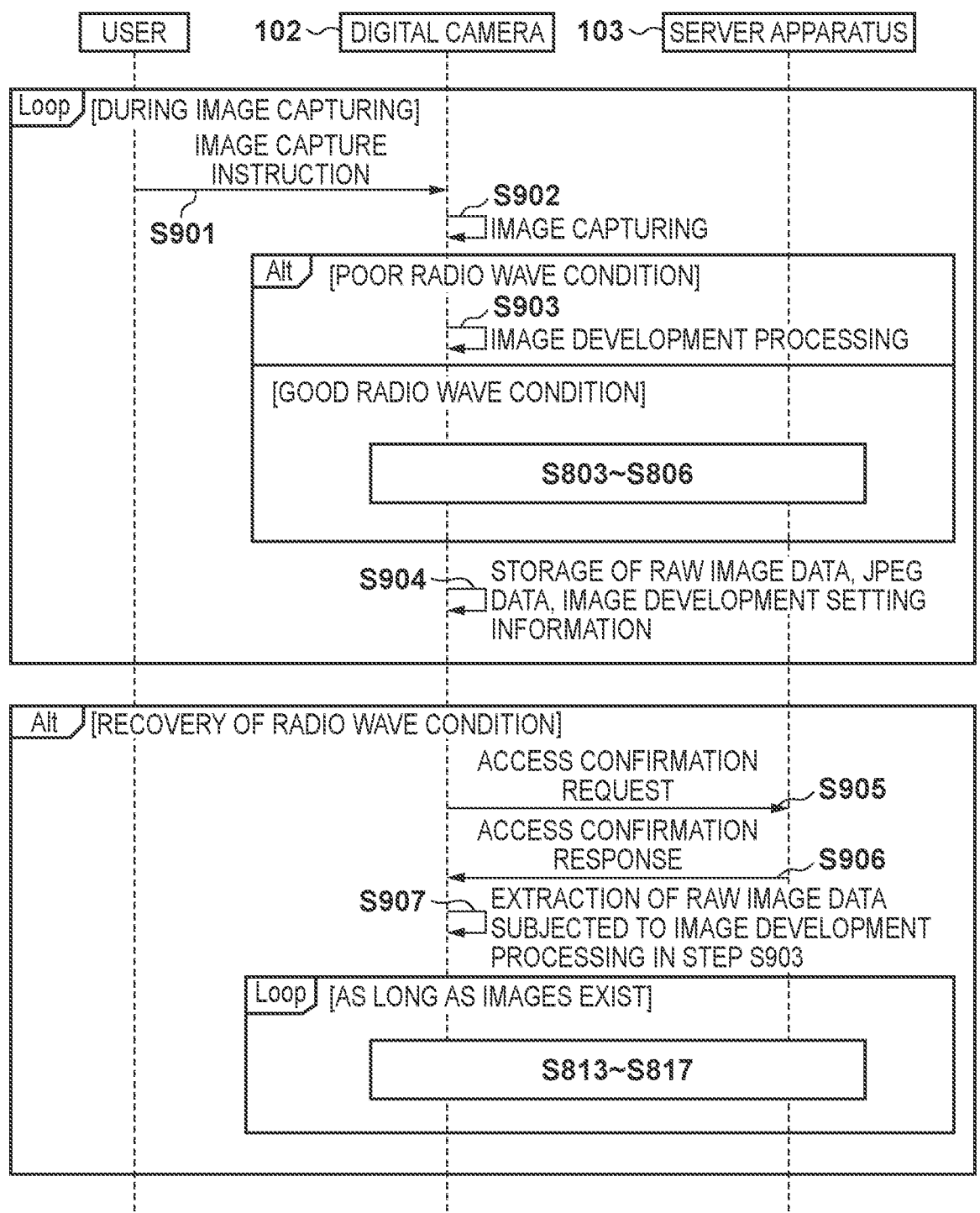

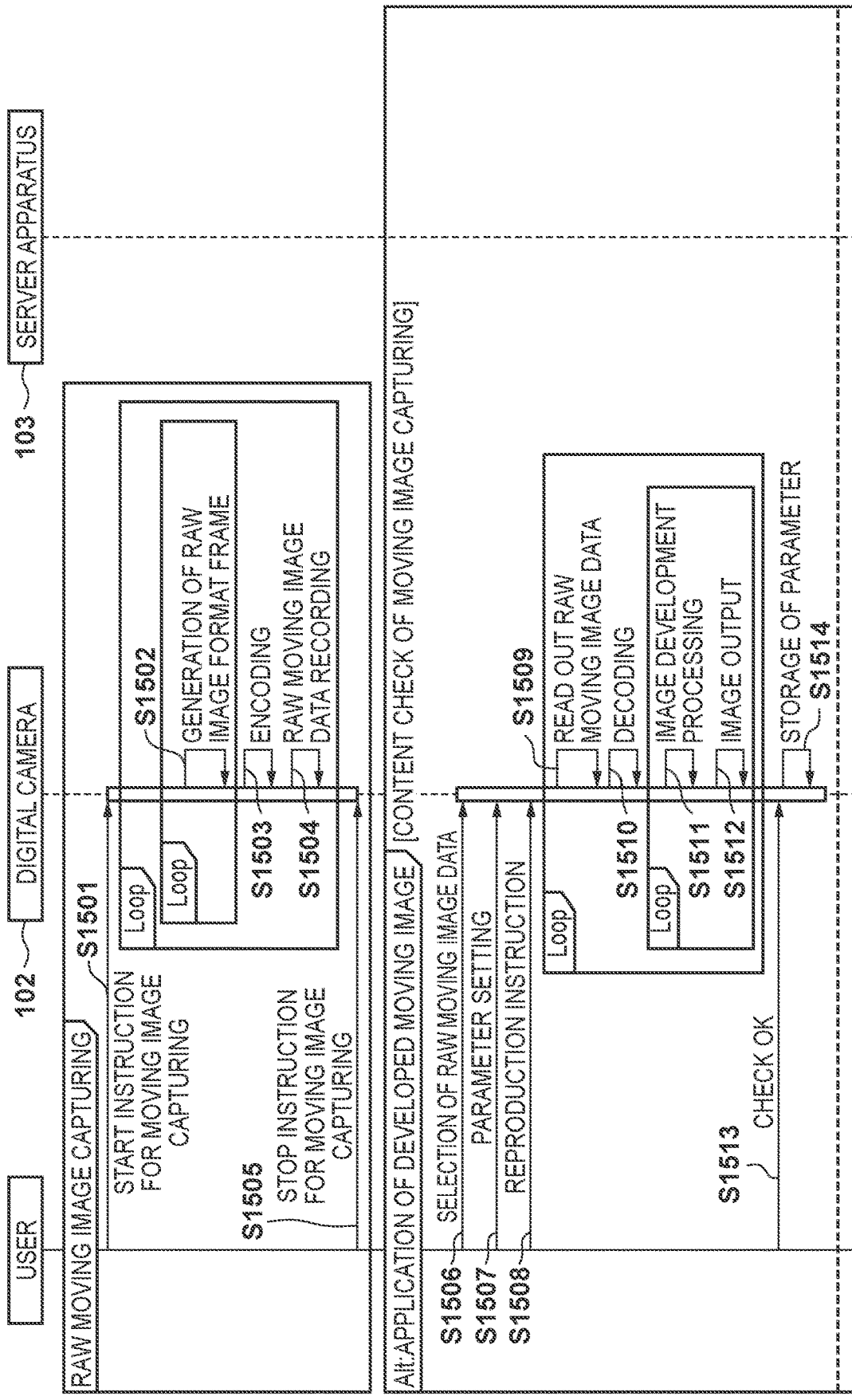

IMAGE PROCESSING APPARATUS AND CONTROL METHOD THEREOF

BACKGROUND OF THE INVENTION

Field of the Invention

The present invention relates to a system for executing image processing using a cloud service or the like.

Description of the Related Art

A user can finish an image as intended by executing an image development processing for RAW image data by a Personal Computer (PC) or the like, as compared with a case of executing the image development processing by a digital camera or the like. In addition, as in Japanese Patent Laid-Open No. 2009-44256, there is a system that can generate an image having a higher quality than an image by executing the image development processing by the PC, by means of executing the image development processing on a server apparatus with utilizing more advanced image development function provided by a cloud service or the like (image development processing in the cloud).

However, since it is assumed that the image development processing in the cloud (cloud image development) is needed to communicate with the server apparatus, it is not always optimal to use the cloud image development due to various factors.

For example, when a communication state is poor, when an immediacy is required in the image development processing, or the like, it may be preferable to perform the image development processing in the internal apparatus such as the PC instead of executing the image development processing in the external apparatus such as the server apparatus. When there are a large number of RAW image data to be subjected to the cloud image development, there is a possibility that a long time is required until the image development processing for all the RAW image data is completed.

SUMMARY OF THE INVENTION

The present invention has been made in consideration of the aforementioned problems, and realizes techniques for efficiently utilizing external image processing function.

In order to solve the aforementioned problems, the present invention provides an image processing apparatus comprising: a communication unit configured to communicate with an external apparatus; an image processing unit configured to perform first image processing on first image data; and a control unit configured to transmit a request for executing second image processing which is different from the first image processing on the first image data to the external apparatus via the communication unit, and receive second image data on which the second image processing has been executed from the external apparatus via the communication unit, wherein in response that a function of the second image processing executable in the external apparatus is updated, the control unit determines whether to transmit a request again for executing the second image processing to the external apparatus.

In order to solve the aforementioned problems, the present invention provides an image processing apparatus comprising: a communication unit configured to communicate with an external apparatus; an image processing unit configured to perform first image processing on first image data; and a control unit configured to transmit a request for executing second image processing which is different from the first image processing on the first image data to the external apparatus via the communication unit, and receives second image data on which the second image processing has been executed from the external apparatus via the communication unit, wherein the control unit determines whether to transmit a request again for executing the second image processing to the external apparatus, according to a communication state with the external apparatus.

In order to solve the aforementioned problems, the present invention provides an image processing apparatus comprising: a communication unit configured to communicate with an external apparatus; an image processing unit configured to perform first image processing on first image data; and a control unit configured to transmit a request for executing second image processing which is different from the first image processing on the first image data to the external apparatus via the communication unit, and receives second image data on which the second image processing has been executed from the external apparatus via the communication unit, wherein the control unit determines whether to transmit a request again for executing the second image processing to the external apparatus in accordance with an application of the second image data on which the second image processing has been executed.

In order to solve the aforementioned problems, the present invention provides a method of controlling an image processing apparatus comprising a communication unit configured to communicate with an external apparatus and an image processing unit configured to perform first image processing on first image data, the method comprising: transmitting a request for executing second image processing on the first image data which is different from the first image processing to the external apparatus via the communication unit; receiving from the external apparatus second image data on which the second image processing has been executed via the communication unit; and in response that a function of the second image processing executable in the external apparatus is updated, determining whether to transmit a request again for executing the second image processing to the external apparatus.

In order to solve the aforementioned problems, the present invention provides a non-transitory computer-readable storage medium storing a program for causing a computer to execute a method of controlling an image processing apparatus comprising a communication unit configured to communicate with an external apparatus and an image processing unit configured to perform first image processing on first image data, the method comprising: transmitting a request for executing second image processing on the first image data which is different from the first image processing to the external apparatus via the communication unit; receiving from the external apparatus second image data on which the second image processing has been executed via the communication unit; and in response that a function of the second image processing executable in the external apparatus is updated, determining whether to transmit a request again for executing the second image processing to the external apparatus.

According to the present invention, the external image processing function can be efficiently utilized.

Further features of the present invention will become apparent from the following description of exemplary embodiments (with reference to the attached drawings).

BRIEF DESCRIPTION OF THE DRAWINGS

FIG. 3 is a block diagram illustrating a configuration of a digital camera according to first, second, third and fourth and fifth embodiments.

FIG. 4 is a block diagram illustrating a configuration of a server apparatus according to first, second, third and fifth embodiments.

FIGS. 5A-5B are sequence diagrams of the first embodiment.

FIGS. 8A-8B are sequence diagrams according to second embodiment.

FIG. 9 is a sequence diagram according to third embodiment.

FIGS. 15A-15B are sequence diagrams according to sixth embodiment.

DESCRIPTION OF THE EMBODIMENTS

Figure 1:
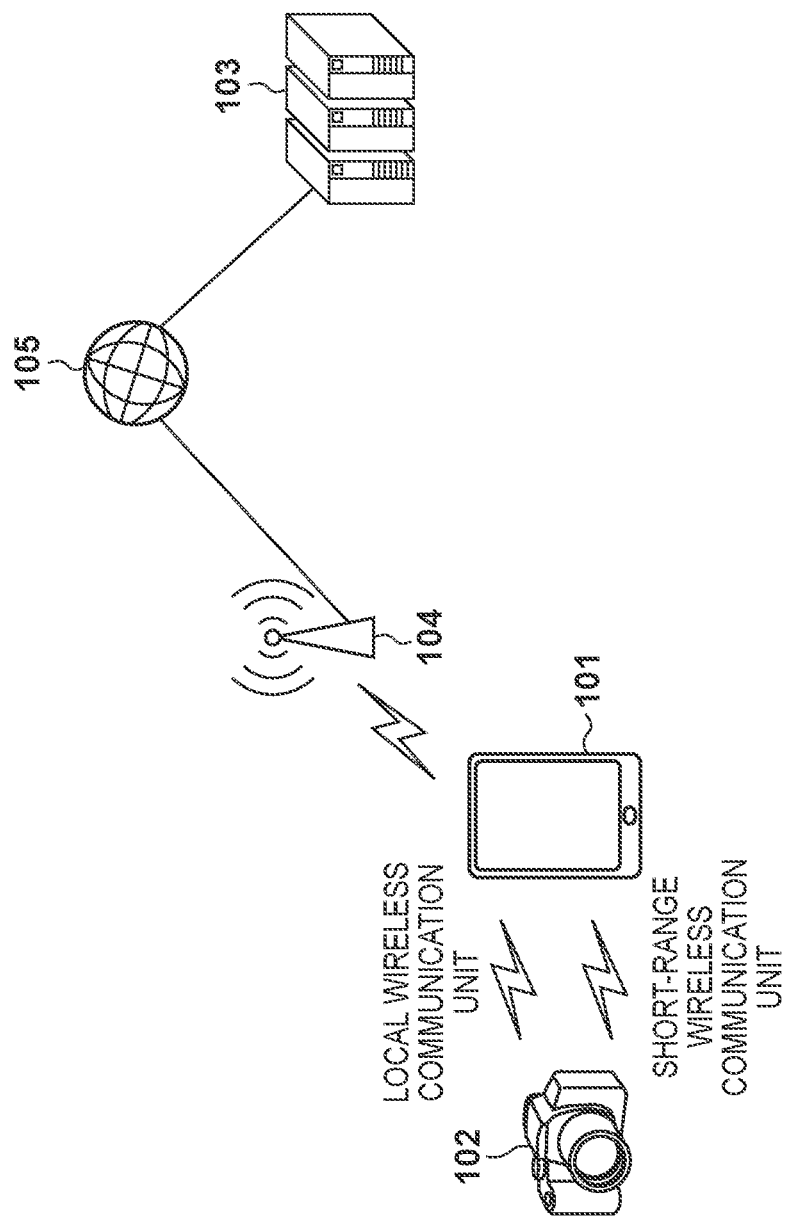
FIG. 1 is diagram illustrating a system configuration according to first and fifth embodiments.

An exemplary embodiment of the present invention will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In the present embodiment, an example in which some or all of the image development processing for RAW image data to be executed by the smart device 101 or the digital camera 102 are executed by using a server computer (server apparatus 103) of a service site that provides an image development processing function higher than an image development processing that will be executed by the smart device 101 or the digital camera 102, will be described. In the present embodiment, the example in which image development processing is executed on RAW image data in the server apparatus 103 will be described, but image processing other than the image development processing exemplified in the present embodiment may be executed.

First Embodiment

In the first embodiment, an example in which a cloud image development is executed on RAW image data held by the smart device 101 in response to an update of the image development function of the server apparatus 103 will be described.

<System Configuration>

First, a system configuration of the present embodiment will be described with reference to FIG. 1.

The system of the present embodiment includes a smart device 101, a digital camera 102, a server apparatus 103, a wireless base station 104, and a communication network 105.

It is assumed that a user owns the smart device 101 and the digital camera 102. The smart device 101 is installed with a cloud application for utilizing a cloud service provided by the server apparatus 103. The smart device 101 and the server apparatus 103 can communicate with the server apparatus 103 by connecting to the communication network 105 via the wireless base station 104. The communication network 105 may be a WAN (Wide Area Network), the Internet, a public network, or the like.

The smart device 101 is an information processing apparatus that can use various cloud services provided by the server apparatus 103. In the present embodiment, an image development function (cloud image development) of RAW image data is assumed as a cloud service provided by the server apparatus 103, and the smart device 101 can use the cloud image development service provided by the server apparatus 103 via an image development application.

The cloud image development has a function of uploading RAW image data held by the smart device 101 to the server apparatus 103, executing image development processing on the RAW image data by the server apparatus 103, and returning the developed image data to the smart device 101. The user sets parameters of the cloud image development with the image development application of the smart device 101, and transmits an instruction for setting the parameters to the server apparatus 103. The server apparatus 103 executes the image development processing every time the instruction for setting the parameter is received, and returns the developed image data as a JPEG file to the smart device 101. In this manner, the user can finish the RAW image data to his or her own preference while checking the result of the cloud image development. As described above, in the cloud image development, even when the image development processing performance of the smart device 101 is low, more advanced image development processing can be provided in the server apparatus 103, and the latest image development processing can always be provided to the user by updating the image development function of the server apparatus 103.

The RAW image data used by the smart device 101 is image data such as a still image or a moving image generated by the digital camera 102, and is converted into a file without image development processing. When image capturing is performed using the digital camera 102, the user performs the image capturing in a mode in which the RAW image data is recorded, and thereafter transfers the RAW image data from the digital camera 102 to the smart device 101. A wireless LAN (Local Area Network) is used for the data transfer. Raw image data can be transferred from the digital camera 102 to the smart device 101 by using a PTP-IP that realizes PIP (Picture Transfer Protocol) on IP (Internet Protocol).

<Configuration of Smart Device 101>

Next, with reference to FIG. 2, the configuration and functions of the smart device 101 will be described.

A control unit 201 is an arithmetic processing unit (CPU) for collectively controlling the entire smart device 101, by executing a program stored in ROM 202, to realize an operation sequence that will be described later. Note that instead of the control unit 201 controlling the entire apparatus, a plurality of pieces of hardware may distribute processing to perform control of the entirety of the apparatus.

ROM (Read Only Memory) 202 is a non-volatile memory such as an EEPROM that can electronically rewrite data. In the ROM 202, constants, computer programs, and the like for the operation of the control unit 201 are stored. Here, the program includes a program for executing communication processing and image development processing with the digital camera 102 and the server apparatus 103, which will be described later in the present embodiment. Further, the ROM 202 stores an OS (operating system) which is a basic software executed by the control unit 201 and an image development application which realizes an applied function in cooperation with the OS. The processing of the smart device 101 of the present embodiment is realized by reading the software provided by the image development application.

It is assumed that the image development application includes software for utilizing the basic functions of the OS installed in the smart device 101. The OS of the smart device 101 may have software for realizing the processing in the present embodiment.

RAM (Random Access Memory) 203 is a volatile memory used as a work area for expanding a constant, a variable, a program read from the ROM 202, or the like for the operation of the control unit 201.

A storage unit 204 is a recording medium such as a hard disk drive (HDD), a solid state drive comprised of a flash memory (SSD), a hybrid drive using a combination of a hard disk and a flash memory, or a memory card. The storage unit 204 can also record RAW image data.

BMU (Bit Move Unit) 205 controls, for example, data transfer between memories (e.g., between VRAM 206 and other memories) and between memories and individual I/O devices (e.g., the local wireless communication unit 210).

VRAM (Video RAM) 206 renders image data for display on the display unit 208. A display unit 208 includes a monitor and a controller including a liquid crystal panel or an organic panel. The image data rendered on the VRAM 206 is transferred to the display unit 208 at a predetermined frame rate, whereby the image is displayed on the display unit 208. The display unit 208 is provided with a touch panel (touch screen) 207 having a touch sensor capable of detecting a touch operation on a display screen. The touch panel 207 is an input device configured to be overlapped on the display screen of the display unit 208 in a planar shape, so that coordinate information corresponding to the contacted position is output. The control unit 201 can detect the following operations on the touch panel 207. Touching of the touch panel 207 by a finger or pen (touch-down). A state in which the touch panel 207 is in contact with a finger or pen (touch on). Movement of a finger or pen while in contact with the touch panel 207 (touch-move). Lifting of a finger or pen that has been in contact with the touch panel 207 (touch-up). A state in which the touch panel 207 is not being touched at all (touch-off). Continuously performing the touch-down on and the touch-up with a finger or pen on the touch panel 207 is referred to as a tap. These operations and position coordinates at which the finger or pen touches the touch panel are notified to the control unit 201, and the control unit 201 determines what operation has been performed on the touch panel based on the notified information. As for the touch-move, the determination can be made also for every vertical component and horizontal component with regard to the direction of movement of the finger or pen, which is moved on the touch panel 207, based upon a change in the coordinate position. In addition, when the touch-up is made through the touch-move over a predetermined distance from the touch-down on the touch panel 207, it is assumed that a drop is performed through a drag (drag and drop). The touch panel 207 may employ a method that relies upon any of the following: resistive film, electrostatic capacitance, surface acoustic waves, infrared radiation, electromagnetic induction, image recognition and optical sensing.

A short-range wireless communication unit 209 is an interface for communicating with the digital camera 102 by short-range wireless communication, and in the present embodiment, Bluetooth® is assumed. Bluetooth™ is a wireless interface in which a communication speed is low but power consumption is advantageous, and is suitable for transmitting and receiving notifications and simple messages to and from the digital camera 102.

A local wireless communication unit 210 is an interface for performing a high-speed communication with the digital camera 102 via a wireless LAN. The local wireless communication unit 210 is suitable for exchanging large amount of data such as RAW image data of the digital camera 102.

A wide area wireless communication unit 211 is an interface that can be connected to the communication network 105 by communicating with the wireless base station 104.

A system bus 212 includes an address bus, a data bus, and a control bus for communicatively connecting the components 201 to 211 of the smart device 101.

<Configuration of Digital Camera 102>

Next, with reference to FIG. 3, the configuration and functions of the digital camera 102 of the present embodiment will be described.

A control unit 301 is an arithmetic processing unit (CPU) that collectively controls the entire digital camera 102, and executes programs stored in ROM 302 to implement operation sequences that will be described later. Note that instead of the control unit 301 controlling the entire apparatus, a plurality of pieces of hardware may distribute processing to perform control of the entirety of the apparatus.

ROM 302 is a nonvolatile memory such as an EEPROM that can electrically rewrite data. In the ROM 302, constants, computer programs, and the like for the operation of the control unit 301 are stored. Here, the program includes a program for executing communication processing and image development processing with the smart device 101, the smart device 101, and the server apparatus 103, that will be described later in the present embodiment. Further, the ROM 302 stores an OS (operating system) which is a basic software executed by the control unit 301 and an image development application which realizes an applied function in cooperation with the OS.

RAM 303 is a volatile memory used as a work area for expanding constants, variables, computer programs read from the ROM 302, and the like for the operation of the control unit 301.

A storage unit 304 is a recording medium such as a memory card that records RAW image data generated by the image capturing unit 314 or an image file encoded by an encoding unit 316.

BMU 305 controls, for example, data transfer between memories (e.g., between the RAM 303 and other memories) and between memories and individual I/O devices (e.g., a local wireless communication unit 310).

A short-range wireless communication unit 309 is an interface for communicating with the smart device 101 by short-range wireless communication, and in the present embodiment, Bluetooth® (hereinafter, abbreviated to BT) is assumed. A local wireless communication unit 310 is an interface for performing high-speed communication with the smart device 101 via a wireless LAN. A wide area wireless communication unit 311 is an interface that can be connected to the communication network 105 by communicating with the wireless base station 104.

An optical system 313 includes a lens, an aperture, or the like that forms an object image and guides it into the digital camera 102. An image capturing unit 314 includes an imaging device such as a CCD or a CMOS for generating analog image signal by photo-electrically converting the object image formed by the optical system 313, an AD converter circuit for converting the analog image signal into digital signal.

An image processing unit 315 performs predetermined image processing (RAW image development processing) on the image data (including RAW image data) generated by the image capturing unit 314. The encoding unit 316 performs predetermined encoding processing on the image data processed by the image processing unit 315.

A system bus 312 communicatively connects the components 301 to 305, 309 to 311 and 313 to 316 of the digital camera 102.

<Configuration of Server Apparatus 103>

Next, with reference to FIG. 4, the configuration and functions of the server apparatus 103 according to the present embodiment will be described.

A control unit 401 is an arithmetic processing unit (CPU) for collectively controlling the entire server apparatus 103, by executing a program stored in ROM 402, to realize an operation sequence that will be described later. Note that instead of the control unit 401 controlling the entire apparatus, a plurality of pieces of hardware may distribute processing to perform control of the entirety of the apparatus.

ROM 402 is a nonvolatile memory such as an EEPROM that can electrically rewrite data. In the ROM 402, constants, computer programs, and the like for the operation of the control unit 401 are stored. Here, the program includes a program for executing communication processing and image development processing with the smart device 101 and the digital camera 102, which will be described later in the present embodiment. Further, the ROM 402 stores an OS (operating system) which is a basic software executed by the control unit 401 and a development application which realizes an applied function in cooperation with the OS. The processing of the server apparatus 103 according to the present embodiment is realized by reading the software provided by the image development application. It is assumed that the image development application includes software for utilizing the basic functions of the OS installed in the server apparatus 103. The OS of the server apparatus 103 may include software for realizing the processing according to the present embodiment.

RAM 403 is a volatile memory used as a work area for expanding constants, variables, computer programs read from the ROM 402, and the like for the operation of the control unit 401.

A storage unit 404 is a recording medium such as a hard disk drive (HDD), a solid state drive comprised of a flash memory (SSD), a hybrid drive using a combination of a hard disk and a flash memory, or a memory card. The storage unit 404 can also store RAW image data.

BMU 405 controls, for example, data transfer between memories (e.g., between the RAM 403 and other memories) and between memories and individual I/O devices (e.g., a wired communication unit 407).

An image development processing unit 406 can execute predetermined image development processing on the RAW image data. The image development processing is implemented by a software and/or a hardware. The image development processing capability of the image development function can be improved by updating the software. The image development processing is executed on the RAW image data using the image development setting information. The image development setting information is information that summarizes various parameters related to the image development processing, and is information that indicates image development processing executed on the RAW image data by the image development processing unit 406.

A wired communication unit 407 is an interface for connecting to the communication network 105 via a wired communication. A system bus 408 communicably connects the components 401 to 407 of the server apparatus.

<Image Development Processing Sequence>

Next, with reference to FIGS. 5A-5B, the operation when the image development function of the server apparatus 103 is updated in the system of the present embodiment will be described.

Figure 5B:
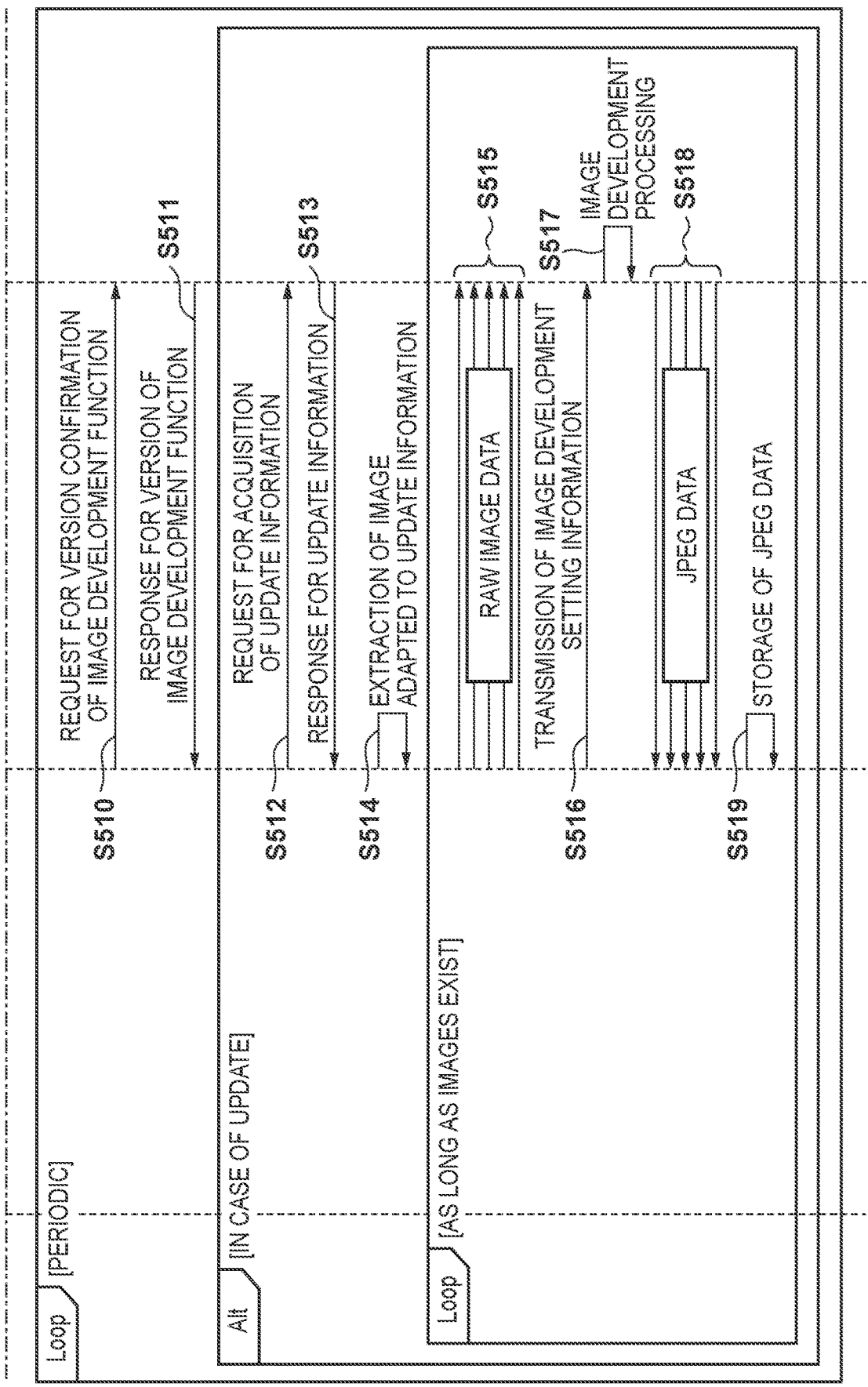

As a precondition of the sequence of FIGS. 5A-5B, it is assumed that the user has already transferred the RAW image data captured by the digital camera 102 to the smart device 101. By the communication between the local wireless communication unit 210 of the smart device 101 and the local wireless communication unit 210 of the digital camera 102, RAW image data stored in the storage unit 304 of the digital camera 102 is transmitted to the smart device 101. Further, the smart device 101 activates the image development application that can use the cloud image development. The user can use the cloud image development function by operating a GUI of the image development application.

In step S501, the smart device 101 starts the processing when the user selects a RAW image to be subjected to the cloud image development. In step S501, the user selects the RAW image by tapping a desired thumbnail from a thumbnail list of RAW image data displayed on the image development application screen of the smart device 101.

In step S502, the smart device 101 performs processing for uploading the RAW image data selected in step S501 to the server apparatus 103. HyperText Transport Protocol (HTTP) is used for the communication protocol with the server apparatus 103, and HTTP PUT message is used for the data transmission. The control unit 201 reads the RAW image data in the RAM 203 from the storage unit 204 by the BMU 205, generates the HTTP PUT message in which the RAW image data becomes Body, and stores the message in the RAM 203. Thereafter, the control unit 201 transfers the HTTP PUT message from RAM 203 to the wide area wireless communication unit 211 by BMU 205, whereby the RAW image data is transmitted. The transmitted data is delivered to the server apparatus 103 connected via the wireless base station 104 to the communication network 105. In the server apparatus 103, the control unit 401 controls the BMU 405 and performs reception processing for transferring data received by the wired communication unit 407 to the RAM 403. As a result, the RAW image data can be uploaded to the server apparatus 103.

In step S503, the smart device 101 receives an instruction for THE user to adjust parameters of a desired image development processing in the image development application. By operating the GUI of the image development application, the user can instruct setting of desired image development parameters.

In step S504, the smart device 101 transmits, as an image development request, image development setting information including image development parameters set in step S503 to the server apparatus 103. The image development request uses HTTP POST messaging. The control unit 201 stores in the RAM 203 the HTTP POST message in which the image development setting information designated by the user becomes Body. The processing until the HTTP POST message stored in the RAM 203 is delivered to the server apparatus 103 is the same as step S502.

In step S505, the server apparatus 103 executes the image development processing on the RAW image data received in step S502 using the image development setting information received in step S504. The control unit 401 transfers the RAW image data and the image development setting information stored in the RAM 403 by the BMU 405 to the image development processing unit 406, thereby starting the image development processing. The image development processing is executed by the image development processing unit 406, and the image development processing is completed by writing the generated MEG data in the RAM 403 by the BMU 405.

In step S506, the server apparatus 103 returns the developed MEG data to the smart device 101. The return processing is executed as a response to the HTTP POST message in step S504. The control unit 401 generates a HTTP response message having JPEG data stored in the RAM 403 in Body in step S505, and transmits the HTTP response message to the wired communication unit 407 by the BMU 405.

The transmitted HTTP response message is delivered to the smart device 101 via the wireless base station 104 from the server apparatus 103 connected to the communication network 105. In the smart device 101, the control unit 201 performs reception processing for transferring data received via the wide area wireless communication unit 211 to the RAM 203 by the BMU 405. This allows the developed JPEG data to be transmitted from the server apparatus 103 to the smart device 101.

In step S507, the smart device 101 performs processing for displaying JPEG data received in step S506. The control unit 201 displays JPEG data stored in the RAM 203 by the BMU 205 on the display unit 208 by writing to the VRAM 206.

Through the processing from steps S503 to S507, the user can confirm the image development result when the image development processing is executed using the desired image development parameters. By repeating the process from steps S503 to S507, the user can finish the RAW image data to his or her own preference.

If it is determined that the RAW image data has been finished to his or her preferences, in step S508 the user issues a storage instruction to the smart device 101. The storage instruction can be issued by operating the GUI of the image development application.

In step S509, the smart device 101 performs storage processing in accordance with the storage instruction received in step S508. The control unit 201 transfers JPEG data stored in the RAM 203 to the storage unit 204 by the BMU 205, associates the RAW image data, JPEG data, and the image development setting information with each other, and stores the RAW image data and the image development setting information in the storage unit 204, thereby performing storage processing.

The above described operation is basic processing when the cloud image development is executed. Next, the processing when the image development function is updated in the server apparatus 103 will be described. The following processing is performed as background processing of the smart device 101.

In step S510, the smart device 101 transmits a version check request for the image development function of the server apparatus 103. HTTP GET message is used to transmit the request. The control unit 201 generates the HTTP GET message for the URL (Uniform Resource Locator) for confirming the image development function, and stores it in the RAM 203. The processing until the HTTP GET message stored in the RAM 203 is delivered to the server apparatus 103 is the same as the processing of step S502.

In step S511, the server apparatus 103 returns the version information of the image development function to the smart device 101. The return processing is executed as a response to the HTTP GET message of step S510. The control unit 401 confirms the version of the software of the image development processing unit 406, generates a HTTP response message having the version information in its Body, and transfers HTTP response message to the wired communication unit 407 by BMU 405, thereby performing the transmitting processing. The processing until the HTTP response message is delivered to the smart device 101 is the same as the processing of step S506.

The smart device 101 can confirm the version information of the image development function of the server apparatus 103 by the information received in step S511. If the version information is the same as the previous one, nothing is done.

If the smart device 101 can confirm the change to the version, the processing proceeds to step S512. The confirmation of the version of steps S510 and S511 is also periodic processing performed in background in the smart device 101. As an example, once a day is conceivable. Thus, the capability of the image development function of the server apparatus 103 can be grasped.

If the updating of the image development function of the server apparatus 103 is confirmed in step S511, the smart device 101 transmits the updating information acquirement message in step S512. Messages are transmitted in the same way as step S510 using the HTTP GET messages. The control unit 201 generates the HTTP GET message for the URL for acquiring the update information and stores it in the RAM 203. The processing until the HTTP GET message stored in the RAM 203 is delivered to the server apparatus 103 is the same as the processing of step S502.

In step S513, the server apparatus 103 returns the update information to the smart device 101. The return processing is executed as a response to the HTTP GET message of step S512. The control unit 401 confirms the update information of the image development processing unit 406, generates the HTTP response message having the update information as the Body, and performs processing for transferring the HTTP response message to the wired communication unit 407 by the BMU 405. The processing until the HTTP response message is delivered to the smart device 101 is the same as the processing of step S506.

Figures 6, 7:
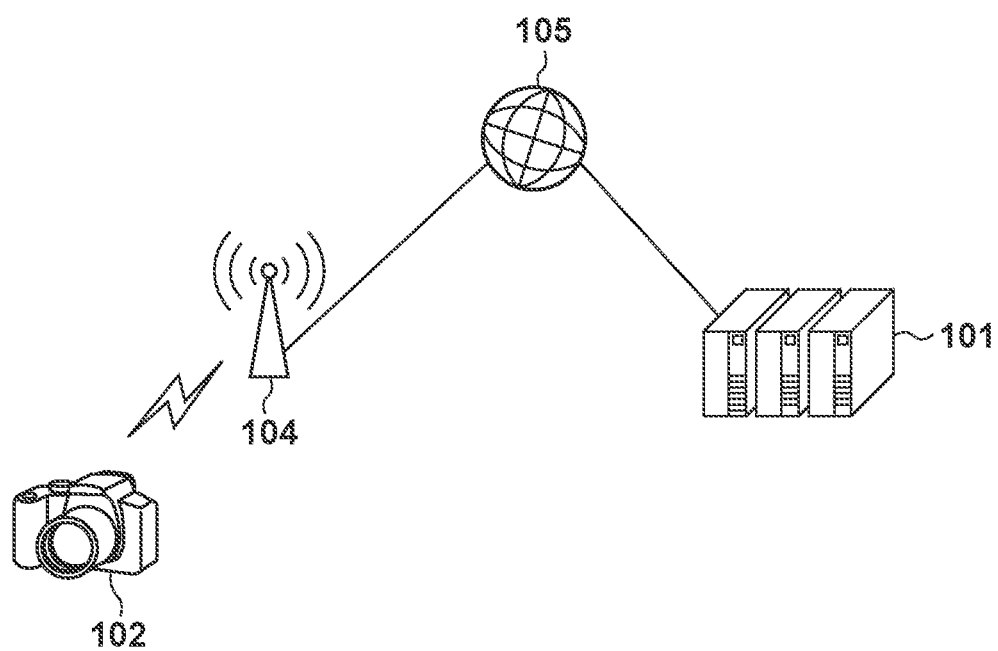
FIG. 6 is a diagram illustrating a data structure of update information of the image development function according to first, second and fifth embodiments.
FIG. 7 is a diagram illustrating a system configuration according to second and third embodiments.

FIG. 6 illustrates a data configuration of update information according to the present embodiment. The update information includes information describing the content improved in the image development function. In FIG. 6, as the update information, the lens correction function (corresponding to lens correction) and the noise reduction function (improvement of the noise reduction algorithm) are exemplified. The lens correction function (countermeasure of lens correction) is the correction of distortion for each lens. Since it is necessary to adjust the correction according to the characteristics of each lens, it is difficult to correspond to all lenses. Especially for lenses that are old in manufacturing, the countermeasure is postponed, and therefore, it is continuously added as an update of the image development function. The noise reduction function (improvement of the noise reduction algorithm) is an improvement of the algorithm to suppress the highly sensitive noise. It is effective for improving the image quality of the image development result of RAW image data captured with a high ISO sensitivity setting.

In step S514, the smart device 101 extracts RAW image data adapted to the update information from among the RAW image data stored in the storage unit 204 based on the update information of the image development function acquired in step S513. In the present embodiment, since the lens correction function and the noise reduction function are used, the RAW image data captured by the lens adapted to the lens correction function and the RAW image data captured by the high sensitivity setting are extracted. In particular, as the high-sensitivity setting, images that have been captured with a setting higher than ISO3200 are selected.

In steps S515 to S519, the smart device 101 sequentially executes the image development processing again on the RAW image data extracted in step S514.

In step S515, the smart device 101 uploads the RAW image data to the server apparatus 103, and the upload processing is the same as the processing of step S502.

In step S516, the smart device 101 transmits image development setting information related to the RAW image data uploaded in step S515 to the server apparatus 103. The image development setting information related to the RAW image data is associated with the storage processing in step S509. The transmission processing is the same as the processing of step S504. Thereafter, the image development processing in the server apparatus 103 in step S517 and the developed MEG data in step S518 are transferred from the server apparatus 103 to the smart device 101. This processing is also the same as the processing of steps S505 and S506.

In step S519, the smart device 101 performs storage processing for JPEG data. In the storage processing, JPEG data stored in the storage unit 204 in association with the RAW image data is replaced. The control unit 201 overwrites the JPEG data stored in the RAM 203 by the BMU 205 to an area in which the MEG data has already been stored. The smart device 101 repeats the processing from steps S515 to S519 by the number of RAW image data extracted in step S514.

In the present embodiment, the operation sequence of executing the image development processing again on the RAW image data adapted to the update content in accordance with the update of the image development function of the server apparatus 103 has been described. This can be said to be processing for executing the image development processing again triggered by appearing a new image development function in the server apparatus 103. Further, in this image development processing, the RAW image data to be developed again is limited to the RAW image data adapted to a change item of the image development function in the server apparatus 103. By efficiently utilizing the image development function of the server apparatus 103, the smart device 101 can realize the best development result with the minimum necessary image development processing without executing the image development processing for all the RAW image data held by the smart device 101.

In the present embodiment, the lens correction function (countermeasure of lens correction) and the noise reduction function (improved noise reduction algorithm) described in FIG. 6 are exemplified as the update contents of the image development function in the server apparatus 103, but they are not limited thereto. Other development functions may include at least one of an exposure compensation function, a white balance adjustment function, an HDR (High Dynamic Range) function, a contrast adjustment function, a sharpness adjustment function, and a saturation adjustment function.

In addition, in the present embodiment, an example in which the RAW image data adapted to the update content is extracted by using all the RAW image data stored in the storage unit 304 as a population when the RAW image data to be developed again is selected has been described, but the present embodiment is not limited to this, and there is also a method of narrowing the population. For example, the RAW image data on which the cloud image development has ever been executed once in the past is used as a population, that is, RAW image development data that the user considers valuable is selected and developed again in consideration of a past RAW development history, so that image development can be executed again more efficiently.

Further, in the present embodiment, although the example in which the RAW image data is uploaded to the server apparatus 103 in the processing of step S515 of FIG. 5B has been described, depending on the specifications of the server apparatus 103, the server apparatus 103 may hold the RAW image data that has been uploaded in the past. Therefore, in such cases, the uploading of the RAW image data may not be performed in step S515.

Second Embodiment

Next, the second embodiment will be described.

In the second embodiment, an example in which, in the system of the first embodiment, the cloud image development is executed on the RAW image data held by the digital camera 102 in response to the update of the image development function of the server apparatus 103 will be described.

First, the system configuration of the present embodiment will be described with reference to FIG. 7.

The system of the present embodiment includes the digital camera 102, the server apparatus 103, the wireless base station 104, and the communication network 105.

The user owns the digital camera 102. The digital camera 102 has a function of communicating with the server apparatus 103. The digital camera 102 can communicate with the server apparatus 103 by connecting to the communication network 105 via the wireless base station 104.

The digital camera 102 is an image capture apparatus that can use various cloud services provided by the server apparatus 103. In the present embodiment, the cloud image development function of RAW image data is assumed as the cloud service provided by the server apparatus 103, and the digital camera 102 can use the cloud image development service provided by the server apparatus 103 via the image development application.

The system of the present embodiment is an example in which the server apparatus 103 substitutes the image development function of the digital camera 102. The digital camera 102 uploads the RAW image data to the server apparatus 103, and the server apparatus 103 executes the image development processing on the RAW image data, and returns the developed image data to the digital camera 102. As described above, by executing the image development process of the digital camera 102 in the server apparatus 103, the latest image development process can always be provided to the user by updating the image development function of the server apparatus 103.

The configuration and functions of the digital camera 102 and the server apparatus 103 in the present embodiment are the same as those of FIG. 3 and FIG. 4 of the first embodiment.

Figure 8B:
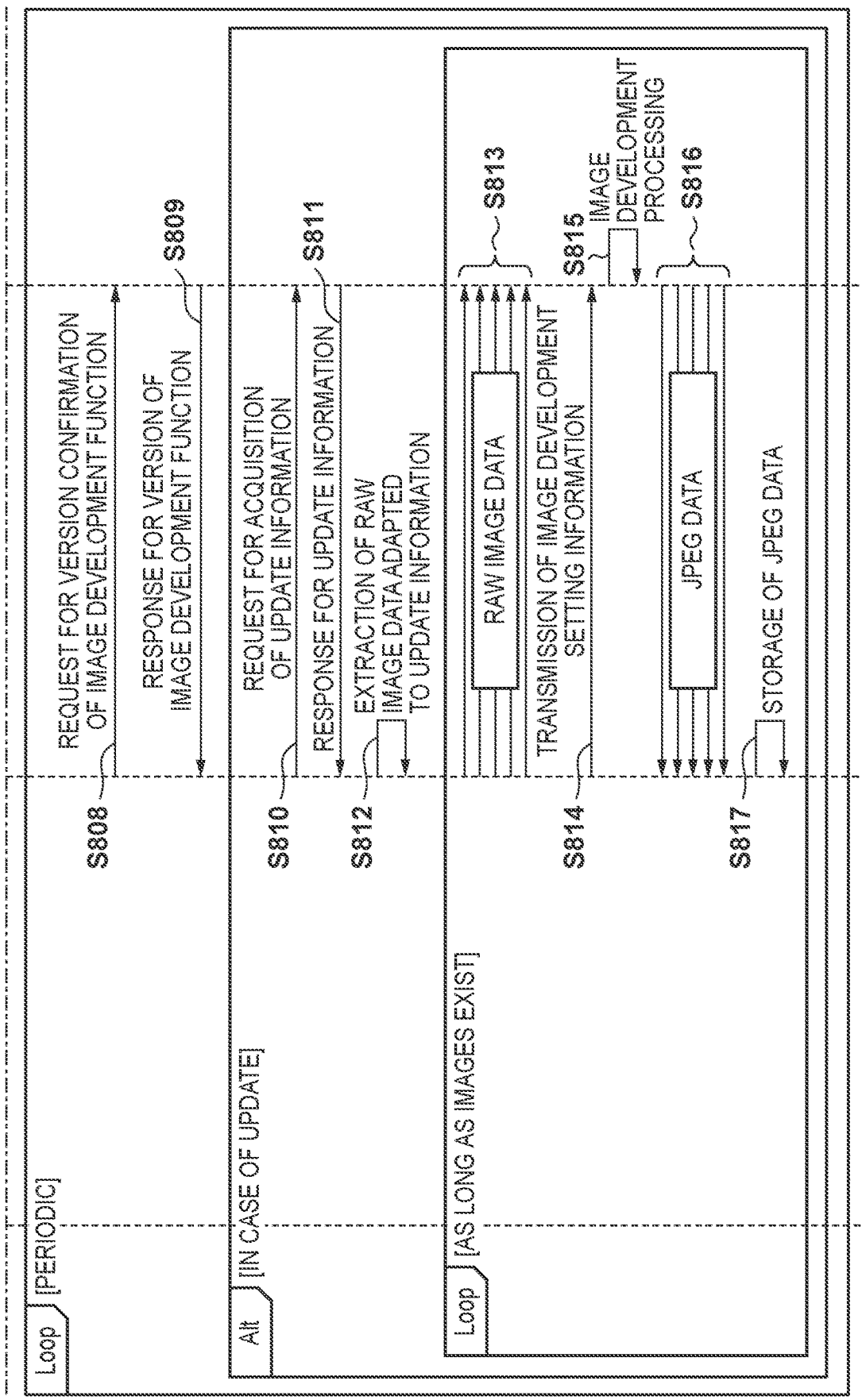

Next, with reference to FIGS. 8A-8B, the operation sequence when the image development function of the server apparatus 103 is updated in the system of the present embodiment will be described. In the sequence of FIGS. 8A-8B, as compared with the sequence of FIGS. 5A-5B, the communication partner of the server apparatus 103 is changed from the smart device 101 to the digital camera 102, and the same processing as the processing of FIGS. 5A-5B is performed as the processing of the digital camera 102. Therefore, the control unit 201, the ROM 202, the RAM 203, the storage unit 204, the BMU 205, and the wide area wireless communication unit 211 of the smart device 101 may be replaced with the control unit 301, the ROM 302, the RAM 303, the storage unit 304, the BMU 305, and the wide area wireless communication unit 311 of the digital camera 102.

In step S801, the digital camera 102 performs image capturing by operating the digital camera 102 by the user. The user can instruct the digital camera 102 to perform image capturing by pressing the shutter release button provided in the digital camera 102.

In step S802, the digital camera 102 executes image capturing processing.

Digital camera 102 converts the light incident through the optical system 313 into digital image data in the image capturing unit 314. The unprocessed data read from the image capturing unit 314 is RAW image data. If the shutter release button is pressed, the control unit 301 stores the RAW image data read from the image capturing unit 314 in the RAM 303 by the BMU 305, it is possible to hold the RAW image data at the time of the shutter release button being pressed.

In step S803, the digital camera 102 performs processing for uploading the RAW image data stored in the RAM 303 to the server apparatus 103. This processing is the same as the processing of step S502 of FIG. 5A. In step S803, the digital camera 102 transmits the image development setting information. The image development setting information is image development information when the image development processing is executed using the image development function built in the digital camera 102. The transmission processing is the same as the processing of step S504 of FIG. 5A.

In step S805, the server apparatus 103 executes the image development processing on the RAW image data received in step S803 using the image development setting information received in step S804. This processing is the same as the processing of step S505 of FIG. 5A.

In step S806, the server apparatus 103 transmits the developed JPEG data to the smart device 101. The transmission processing is the same as the processing of step S506 of FIG. 5A. As a result, JPEG data is transferred to the digital camera 102 through the image development processing in the server apparatus 103.

In step S807, the digital camera 102 stores RAW image data generated in step S802, the development setting information transmitted in step S803 and the JPEG data received in step S806 in association with each other. The control unit 301 transfers the data held in the RAM 303 by the BMU 305 to the storage unit 204, and stores the RAW image data, JPEG data, and the image development setting information in association with each other in the storage unit 304.

The processing of steps S808 to S817 is the same as the processing of steps S510 to S519 in FIG. 5B. The image development processing is executed again on the RAW image data adapted to the update content from among the RAW image data of the digital camera 102 when triggered by updating the image development function of the server apparatus 103.

The above described processing is processing of developing again the RAW image data held by the digital camera 102 when triggered by adding a new image development function to the server apparatus 103. Further, in the present embodiment, the RAW image data to be developed again is limited to the RAW image data adapted to the change item of the image development function in the server apparatus 103. By efficiently utilizing the image development function of the server apparatus 103, the best image development result can be realized by the digital camera 102 with the necessary minimum image development processing even if the image development processing is not executed on all the RAW image data possessed by the digital camera 102.

In the present exemplary embodiment, the lens correction function (corresponding to the lens correction) and the noise reduction function (improved noise reduction algorithm) described in FIG. 6 are exemplified as the update contents of the image development function in the server apparatus 103, but they are not limited thereto. Other image development functions may include at least one of an exposure compensation function, a white balance adjustment function, an HDR (High Dynamic Range) function, a contrast adjustment function, a sharpness adjustment function, and a saturation adjustment function.

In addition, in the present embodiment, an example in which the RAW image data adapted to the update content is extracted by using all RAW image data stored in the storage unit 304 as a population when RAW image data to be developed again is selected has been described, but the present embodiment is not limited to this, and there is also a method of narrowing the population. For example, the RAW image data on which the cloud image development has ever been executed once in the past is used as a population, that is, the RAW image development data that the user considers valuable is selected and developed again in consideration of the past RAW development history, so that image development can be executed again more efficiently.

Further, in the present embodiment, although the example in which the RAW image data is uploaded to the server apparatus 103 in the processing of step S813 of FIG. 8B has been described, depending on the specifications of the server apparatus 103, the server apparatus 103 may hold the RAW image data that has been uploaded in the past. Therefore, in such cases, the RAW image data may not be uploaded to the RAW image data in step S813.

Third Embodiment

Next, a third embodiment will be described.

In the third embodiment, an example in which, in the system of the first embodiment, the cloud image development is executed on the RAW image data held by the digital camera 102 in accordance with a change of a communication state of the digital camera 102 will be described.

The system configuration of the present embodiment is the same as that of FIG. 7 of the second embodiment. The configurations of the digital camera 102 and the server apparatus 103 of the present embodiment are the same as those of FIG. 3 and FIG. 4 of the first embodiment.

Next, with reference to FIG. 9, the operation sequence when the system of the present embodiment the image development is executed again on the RAW image data held by the digital camera 102 in accordance with the change of the communication state of the digital camera 102 will be described.

In steps S901 and S902, the digital camera 102 performs image capturing according to an instruction fir performing image capturing by the user. These processing are the same as the processing of steps S801 and S802 of FIG. 8A.

Next, the processing branches according to the radio wave condition.

Processing of step S903 is performed when the radio wave condition of the digital camera 102 is poor. The radio wave condition can be grasped by means that the control unit 301 confirms the state of the wide area wireless communication unit 311. In step S903, the digital camera 102 cannot perform the cloud image development by the server apparatus 103 because the radio wave condition is poor. Therefore, the digital camera 102 performs the image development processing by using its own image development function. Until the processing of steps S901 and S902 generating of the RAW image data is completed. The control unit 301 transfers the RAW image data to the image processing unit 315 by the BMU 305 to perform desired image processing, transfers the RAW image data on which the image processing has been executed to the encoding unit 316, and generates JPEG data, thereby completing the image development processing. When the radio wave condition is good, the cloud image development is executed by the server apparatus 103. This processing is the same as the processing of steps S803 to S806 of FIG. 8A.

Thereafter, in step S904, the digital camera 102 stores the RAW image data, the image development setting information, and REG data generated in step S902 in association with each other. This processing is the same as the processing of step S807 of FIG. 8A. Through the processing so far, in the image capturing by the digital camera 102, according to the difference in the radio wave condition of the digital camera 102, there exist the image data developed by the digital camera 102 and the image data developed by the cloud image development. In this case, the cloud image development is more preferable situation because it utilizes the new image development function.

The processing of step S905 and subsequent processing are performed when the radio wave condition of the digital camera 102 is recovered. The processing of step S905 is started when triggered by the communication status being recovered.

In step S905, the digital camera 102 checks whether or not the communication with the server apparatus 103 is possible. Here, the HTTP GET message is used. The control unit 201 generates the HTTP GET message for a predetermined URL managed by the server apparatus 103 and stores it in the RAM 203. The processing until the HTTP GET message stored in the RAM 203 is delivered to the server apparatus 103 is the same as the processing of step S808 of FIG. 8B.

In step S906, the server apparatus 103 returns a response to the access confirmation request in step S905. This processing is performed as a response to the HTTP GET message in step S510, the control unit 401 generates simple response data of HTTP, and transmits HTTP response message to the wired communication unit 407 by the BMU 405. The processing until the response message is delivered to the digital camera 102 is the same as the processing in step S809 of FIG. 8B. Thus, it can be confirmed that the digital camera 102 can communicate with the server apparatus 103.

In step S907, the digital camera 102 extracts from among the RAW image data stored in the storage unit 304 the RAW image data on which the cloud image development that has not been executed and has been captured when the radio wave condition is poor. This means that, due to the radio wave condition of the digital camera 102, the RAW image data in which the processing of step S903 has been performed at the time of image capturing is extracted.

The subsequent processing is the same as the processing of steps S817 from S813 of FIG. 8B. The extracted RAW image data is transmitted to the server apparatus 103, thereby executing the image development processing again by the cloud image development in series.

In the present embodiment, the image development processing is executed again when triggered by increasing usable development functions due to the recovery of the communication by the improvement of the radio wave condition. Further, in the present embodiment, the RAW image data to be developed again is limited to the RAW image data captured at the time of the poor radio wave condition. By efficiently utilizing the image development function of the server apparatus 103, the best development result can be realized by the digital camera 102 with the minimum necessary image development processing.

Fourth Embodiment

Next, a fourth embodiment will be described.

In the fourth embodiment, an example in which, in the system in which the smart device 101 communicates with the digital camera 102, the RAW image data held by the digital camera 102 is developed by the smart device 101 in accordance with a change in the communication and connection states will be described.

Figure 2:
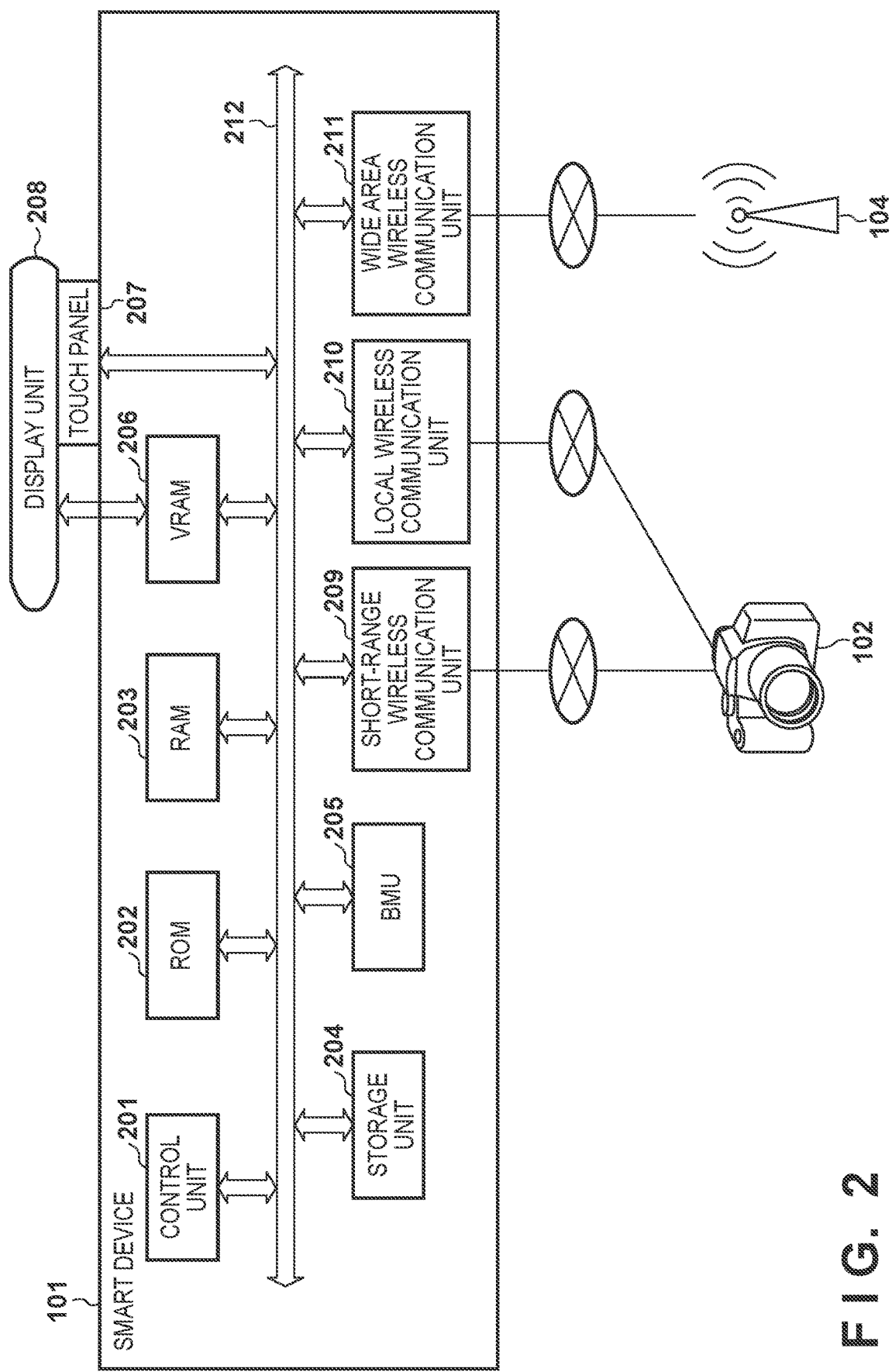
FIG. 2 is a block diagram illustrating a configuration of a smart device according to first, third, fourth, and fifth embodiments.

The configuration and functions of the smart device 101 and the digital camera 102 of the present embodiment are the same as those of FIG. 2 and FIG. 3 of the first embodiment.

Figure 10:
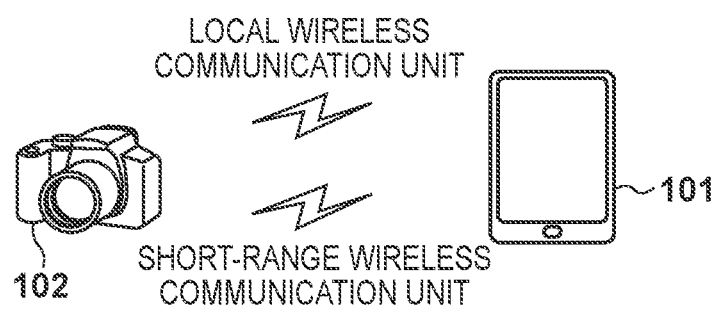
FIG. 10 is a diagram illustrating a system configuration according to fourth embodiment.

FIG. 10 is a diagram of a system configuration of the present embodiment.

The digital camera 102 and the smart device 101 can communicate using two types of wireless communication methods, i.e., a BT and a wireless LAN.

The BT exchanges simple messages such as notifications, and the wireless LAN exchanges large size data such as image data. In the smart device 101, the image development application capable of executing the image development processing on the RAW image data is installed, and the image development processing can be executed by acquiring the RAW image data from the digital camera 102.

The system of the present embodiment is an example in which the smart device 101 substitutes the image development function of the digital camera 102. The digital camera 102 transfers the RAW image data to the smart device 101, and the smart device 101 executes the image development processing on the RAW image data, and returns the developed image data to the digital camera 102. As described above, by executing the image development processing of the digital camera 102 by the smart device 101, the latest image development processing can always be provided to the user by updating the image development application of the smart device 101.

Figure 11A:
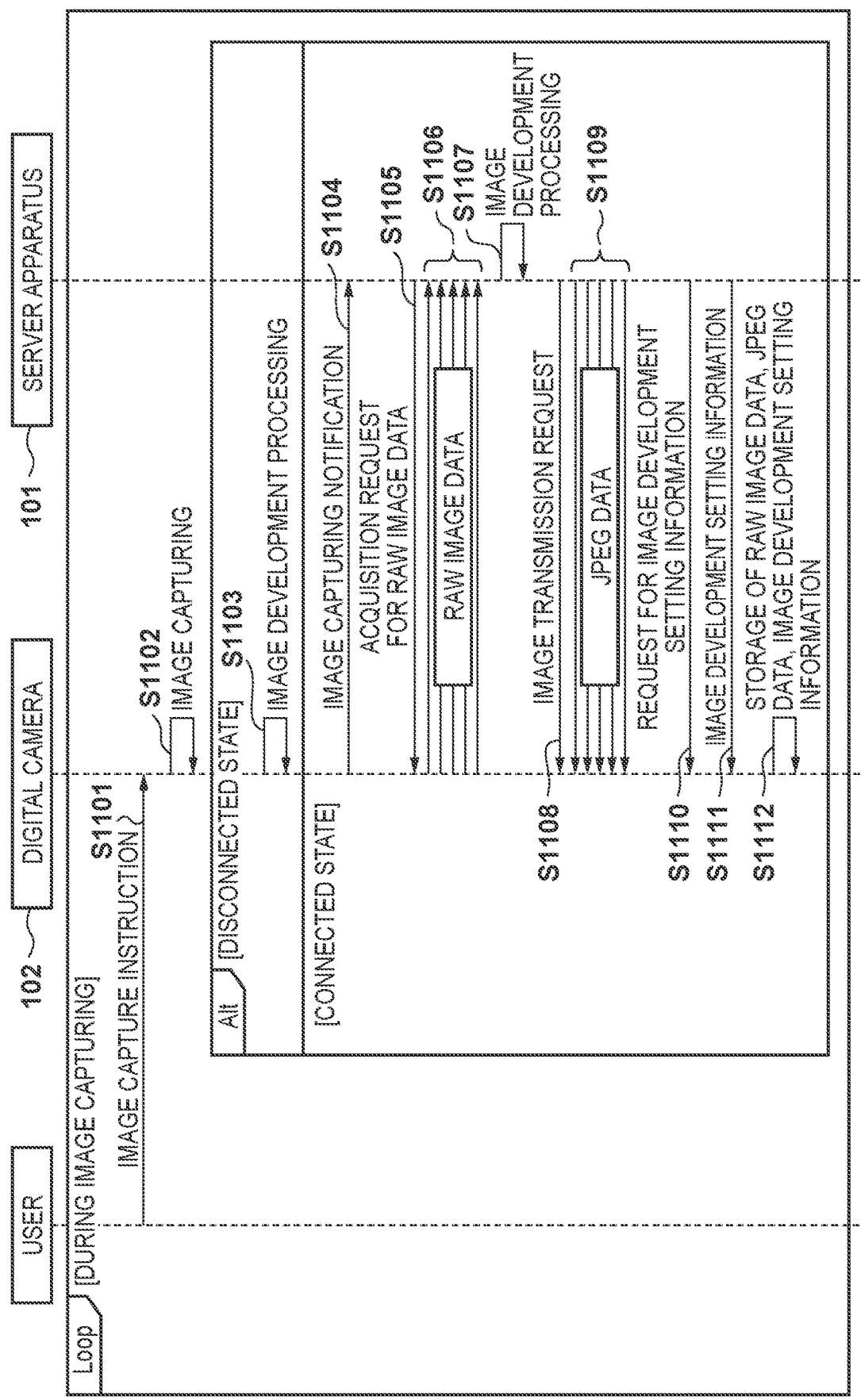
FIGS. 11A-11B are sequence diagrams according to fourth embodiment.
Figure 11B:
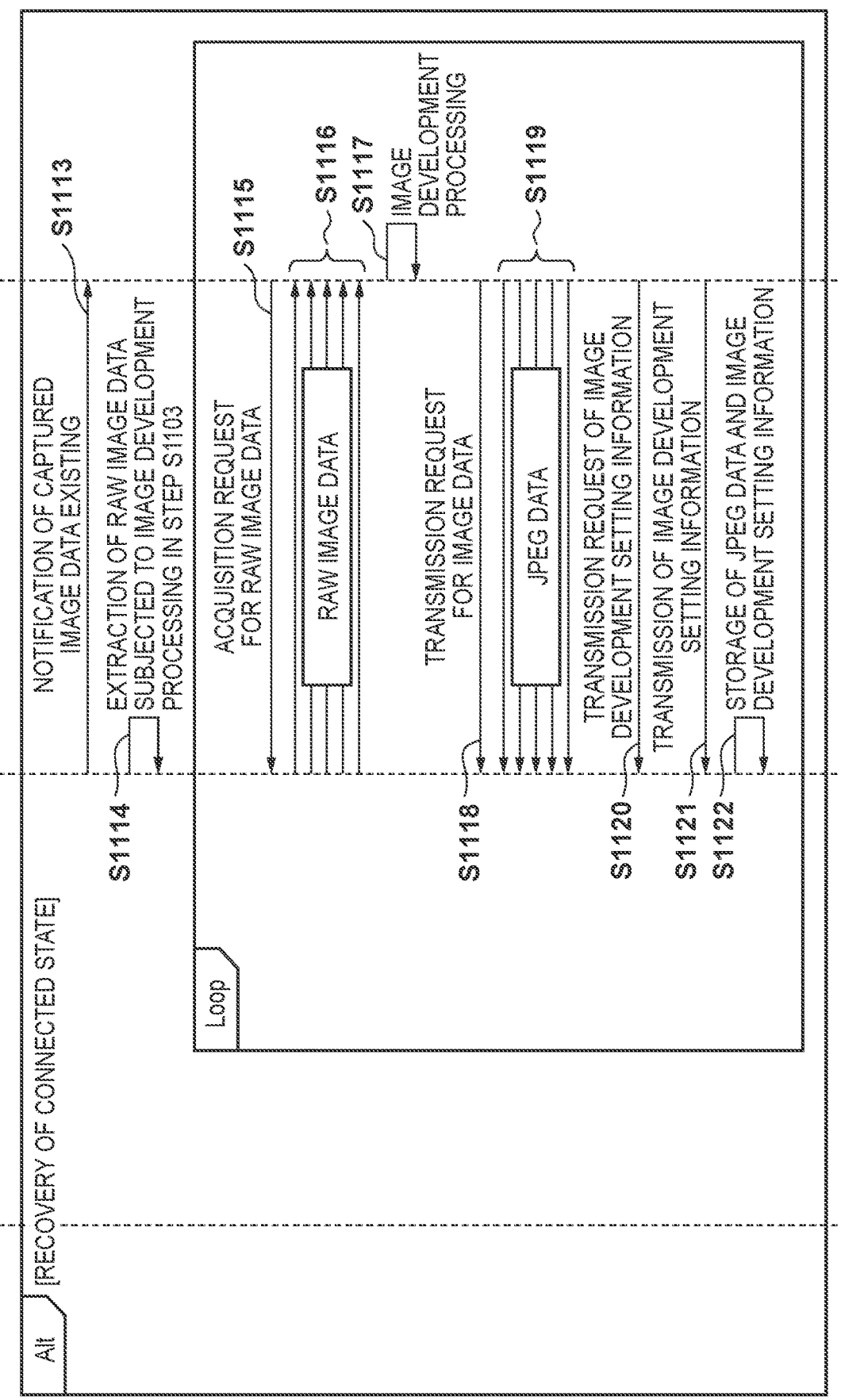
Figure 12:
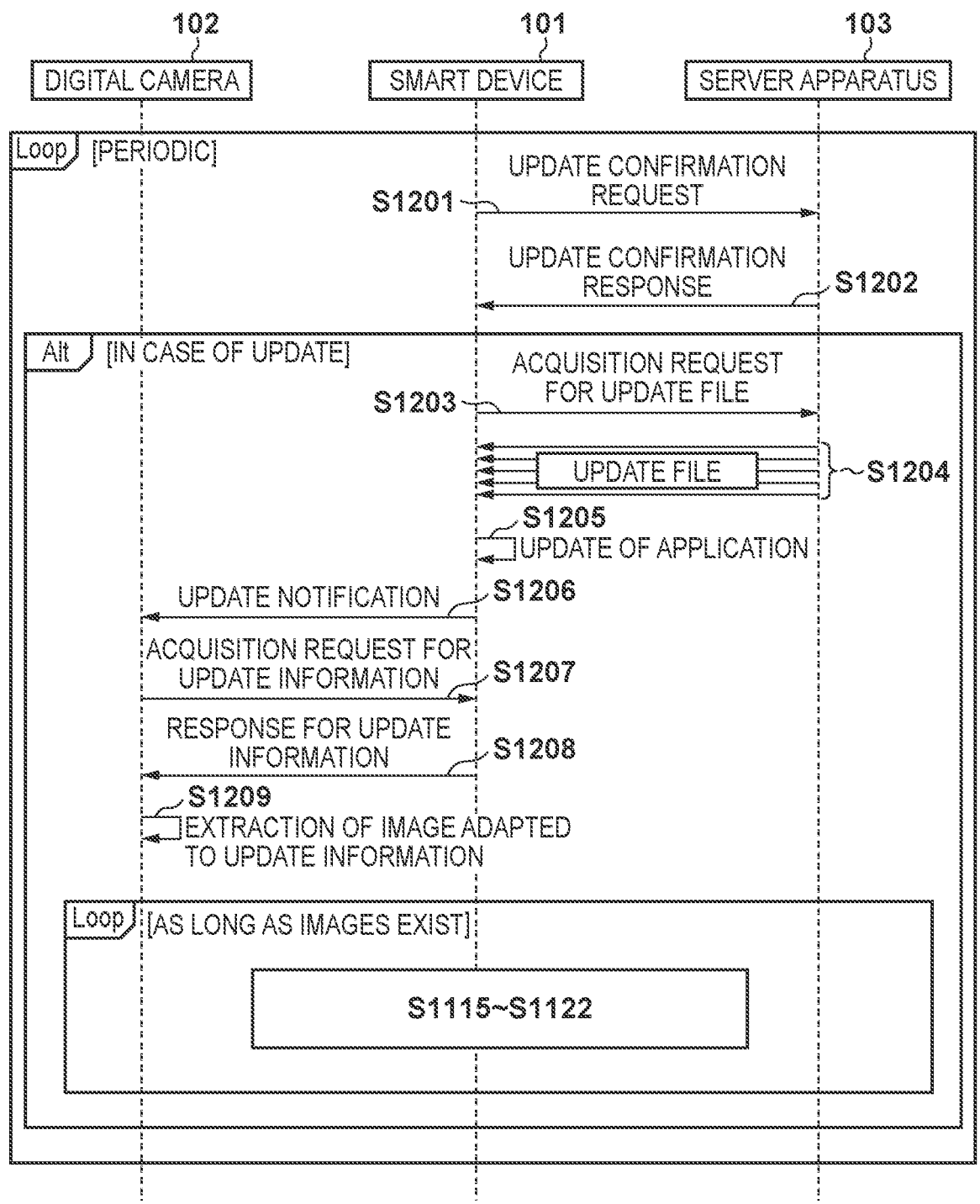
FIG. 12 is a sequence diagram according to fifth embodiment.

Next, with reference to FIGS. 11A-11B, the operation sequence when the image development processing is switched in accordance with the change in the connection state between the digital camera 102 and the smart device 101 in the system of the present embodiment.

The processing of steps S1101 to S1103 is the same as the processing of steps S901 to S903 in FIG. 9. The control unit 301 performs image capturing in response to the shutter release button of the digital camera 102 being pressed by the user to generate RAW image data. Thereafter, in the present embodiment, if the communication state is in a disconnected state, the processing of step S1103 is executed. The disconnected state means that the communication between the digital camera 102 and the smart device 101 by the BT is disconnected. That is, it means that a state in which basic data such as a notification cannot be exchanged. In this case, the image development processing is executed using the image development function of the digital camera 102 in step S1103.

The processing of step S1104 and subsequent processing are performed when the digital camera 102 and the smart device 101 are connected by the BT.

In step S1104, the digital camera 102 notifies the smart device 101 of the fact that the image capturing has been performed. This processing can be realized by the control unit 301 generating a message as an image capturing notification and writing the message to the short-range wireless communication unit 309. The transmitted data is delivered to the smart device 101 in accordance with the BT communication.

In the smart device 101, the control unit 201 performs reception processing for writing the message received by the short-range wireless communication unit 209 in the RAM 203. As a result, the image capturing notification message can be transmitted to the smart device 101.

In step S1105, the smart device 101 transmits a RAW image acquisition request to the digital camera 102. The message to be transmitted is a unique RAM image acquisition request message defined in the PTP command system. This processing can be realized by the control unit 201 writing the RAW image acquisition request message to the local wireless communication unit 210. The message to be transmitted is delivered to the digital camera 102 in accordance with wireless LAN communication. In the digital camera 102, the control unit 301 performs reception processing for writing the message received by the local wireless communication unit 310 to the RAM 303. As a result, the RAW image acquisition request message can be transmitted to the digital camera 102.

In step S1106, the digital camera 102 transmits the RAW image data as a response to the RAW image acquisition request message in step S1105. The control unit 301 transfers the RAW image data from the storage unit 304 to the RAM 303 by the BMU 305, generates a response message to which a header in the response format of the PTP is added, and stores the response message in the RAM 303. Thereafter, the control unit 301 performs transmission processing for transferring a PTP response message including the RAW image data to the local wireless communication unit 310 by the BMU 305. The transferred data is delivered to the smart device 101 in accordance with the wireless LAN communication. The smart device 101 performs a reception processing in which the control unit 201 transfers RAW image data received by the local wireless communication unit 210 to the RAM 203 by the BMU 205.

In step S1107, the smart device 101 performs the image development processing on the RAW image data received in step S1106. The control unit 201 executes the image development processing as software processing. JPEG data is generated as a result of the image development processing by the software.

In step S1108, the smart device 101 transmits an image transmission request message for transferring JPEG data generated in step S1107 to the digital camera 102. The transmission processing is the same as the processing of step S1105.

In step S1109, the smart device 101 transmits the JPEG data. The control unit 201 performs transmission processing for transferring the MEG data stored in the RAM 203 in step S1107 to the local wireless communication unit 210 by the BMU 205. The transferred JPEG data is delivered to the digital camera 102 in accordance with the wireless LAN communication. The digital camera 102 performs reception processing for transferring JPEG data in which the control unit 301 has received via the local wireless communication unit 310 by the BMU 305 to the RAM 303. As a result, the developed JPEG data can be transmitted from the smart device 101 to the digital camera 102.

In steps S1110 and S1111, the smart device 101 transmits the image development setting information used in the image development processing executed in step S1107 to the digital camera 102. The message to be transmitted is a unique image development setting transmission request message defined in the PTP command system. The transmission processing is the same as the processing of steps S1108 and S1109.

In step S1112, the digital camera 102 stores the RAW image data, the image development setting information, and the JPEG data in association with each other. This processing is the same as the processing of step S807 of FIG. 8A. Through the processing so far, in image capturing by the digital camera 102, according to the difference in the connection state between the digital camera 102 and the smart device 101, there exist the image data developed by the digital camera 102 and the image data developed by the smart device 101. This is said to be more preferable situation because the image development processing by the smart device 101 utilizes the new image development function.

The processing of step S1113 and subsequent processing are performed when the communication between the digital camera 102 and the smart device 101 is recovered from the disconnected state to the connected state. When the communication state is recovered, the processing of step S1113 is started.

In step S1113, the digital camera 102 transmits a message for notifying the smart device 101 of the fact that there are the image data captured during the disconnected state. This processing is the same as the processing of step S1104.

In step S1114, the digital camera 102 extracts the RAW image data in the case where the BT connection with the smart device 101 was in the disconnected state and on which the image development processing has not been executed in the smart device 101 from among the RAW image data stored in the storage unit 304. This means that the RAW image data on which the processing of step S1103 has been executed at the time of image capturing in the digital camera 102 is extracted.

From steps S1115 to S1121, the RAW image data extracted in step S1114 is sequentially transmitted to the smart device 101, and the developed image data is transmitted to the digital camera 102 by the image development application of the smart device 101. The transmission processing is the same as the processing from steps S1105 to S1111.

In step S1122, the digital camera 102 performs storage processing for the JPEG data. In the storage processing, the JPEG data and the image development setting information stored in the storage unit 304 in association with the RAW image data is replaced. The control unit 301 overwrites the JPEG data and the image development setting information stored in the RAM 303 by the BMU 305 with an area in which the JPEG data and the image development setting information have already been stored.

In the present embodiment, the image development processing is executed again when trigged by increasing usable development functions due to the recovery of the communication state by the recovery of the connection between the smart device 101 and the digital camera 102. Further, in the present embodiment, the RAW image data on which the image development processing is executed again is limited to the RAW image data captured when the BT connection of the smart device 101 and the digital camera 102 is in the disconnected state. By efficiently utilizing the image development function of the smart device 101, the best image development result can be realized by the digital camera 102 with the minimum necessary image development processing.

Fifth Embodiment

Next, a fifth embodiment will be described.

In the fifth embodiment, an example in which, in the system of the fourth embodiment the RAW image data held by the digital camera 102 is developed in response to the update of the image development application for executing the image development processing in the smart device 101 will be described.

The system configuration of the present embodiment is the same as that of FIG. 1. The image development processing executed by the smart device 101 by the communication with the digital camera 102 is the same as that in FIG. 10. The image development application of the smart device 101 can be updated by communicating with the server apparatus 103. The smart device 101 can execute the latest image development function by updating the image development application.

Since the fifth embodiment assumes the fourth embodiment, during the image capturing by the user using the digital camera 102, by following the processing described in FIGS. 11A-11B, it is possible to provide the best image data to the digital camera 102.

Assuming that, in step S1201 the smart device 101 transmits an update confirmation request for the image development application. This is a message that is intended to confirm whether or not the image development application has been upgraded. This processing is the same as the processing of step S510 of FIG. 5B.

In step S1202, the server apparatus 103 returns a response message to the update confirmation request in step S1201. This processing is the same as the processing of step S511 of FIG. 5B. If the update of the image development application is confirmed by the response message in step S1202, the processing of step S1203 is started.

In step S1203, the smart device 101 transmits a request for acquiring an update file. This is a request message for acquiring an actual update file. This processing is the same as the processing of step S510 of FIG. 5B.

In step S1204, the server apparatus 103 transmits the update file. The update file is transmitted as a response message to the request message in step S1203. This processing is the same as the processing of step S511 of FIG. 5B.

In step S1205, the smart device 101 updates the image development application with the update file acquired in step S1204. The control unit 201 transfers the update file stored in the RAM 203 by the BMU 205 to the storage unit 204, and overwrites an execution file of the image development application stored in the storage unit 204.

In step S1206, the smart device 101 notifies the digital camera 102 of the fact that the image development application has been updated. The notification processing is performed by the BT communication, and can be realized by the control unit 201 transferring a message serving as an update notification to the short-range wireless communication unit 209. The transferred data is delivered to the digital camera 102 according to the BT communication. In the digital camera 102, the control unit 301 performs reception processing for writing the message received by the short-range wireless communication unit 309 in the RAM 303. As a result, the update notification message can be transmitted to the digital camera 102.

In step S1207, the digital camera 102 transmits an update information acquisition request. The request is transmitted via the BT communication. This processing is the same as the processing of step S1104 of FIG. 11A.

In step S1208, the smart device 101 transmits a response containing update information. The update information is the information described in FIG. 6. This processing is the same as the processing of step S1206.

In step S1209, the digital camera 102 extracts image data adapted to the update information from among the RAW image data stored in the storage unit 304 based on the update information of the image development function acquired in step S1208. In the present embodiment, since the lens correction function and the noise reduction function are used, the RAW image data captured by the lens adapted to the lens correction function and the RAW image data captured by the high sensitivity setting are extracted. As a high-sensitivity setting, images that have been captured with settings greater than or equal to ISO3200 are selected.

If there are the RAW image data in step S1209, the image development processing for the extracted RAW image data is executed again according to the processing of steps S1122 to S1115 of FIG. 11B.

The processing of the present embodiment is processing in which the image development processing is executed again triggered by the appearance of the new image development function in the smart device 101. Further, in the present embodiment, the RAW image data to be developed again is limited to the RAW image data adapted to the change item of the image development application of the smart device 101. By efficiently utilizing the image development function of the smart device 101, the best image development result can be realized by the digital camera 102 with the necessary minimum image development processing without executing the image development processing for all the RAW image data held by the digital camera 102.

In the present embodiment, the lens correction function (countermeasure of lens correction) and the noise reduction function (improvement of the noise reduction algorithm) described in FIG. 6 are exemplified as the update contents of the image development functions in the smart device 101, but are not limited thereto. Other image development functions may include at least one of an exposure compensation function, a white balance adjustment function, an HDR (High Dynamic Range) function, a contrast adjustment function, a sharpness adjustment function, and a saturation adjustment function.

In addition, in the present embodiment, an example in which the RAW image data adapted to the update content is extracted from among all the RAW image data stored in the storage unit as a population when the RAW image data to be developed again is selected has been described, but the present embodiment is not limited to this, and there is also a method of narrowing the population. For example, the RAW image data on which the cloud image development has ever been executed once in the past is used as a population, that is, the RAW image development data that the user considers valuable is selected and developed again in consideration of the past RAW image development history, so that the image development can be executed again more efficiently.

Further, in the present embodiment, although the example in which the RAW image data is uploaded to the server apparatus 103 in the processing of step S1116 of FIG. 11B has been described, depending on the specifications of the server apparatus 103, the server apparatus 103 may hold the RAW image data that has been uploaded in the past. Therefore, in such cases, the RAW image data may not be uploaded to the RAW image data in step S1116.

Sixth Embodiment

Next, a sixth embodiment will be described.

In the sixth embodiment, an example on which the cloud image development is executed in accordance with the application of the image data captured by the digital camera 102 in the system of the first embodiment will be described. In the present embodiment, it is assumed that the digital camera 102 is capable of capturing a moving image in addition to a still image, and is capable of executing the image development processing for moving image data captured by the digital camera 102.

First, with reference to FIG. 13, the configuration and functions of the digital camera 102 of the present embodiment will be described.

Figure 13:
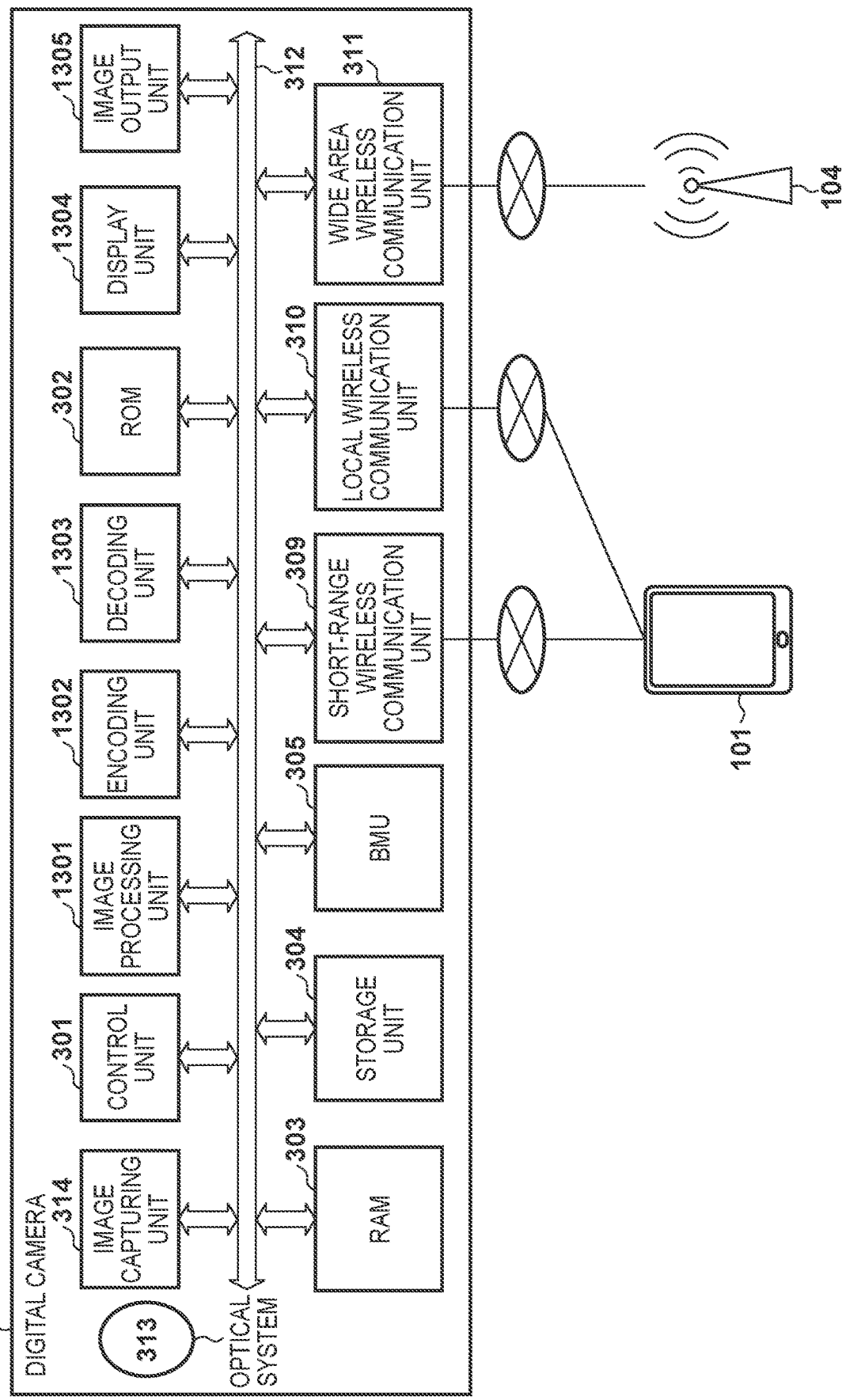
FIG. 13 is a block diagram illustrating a configuration of a digital camera according to sixth embodiment.

In FIG. 13, the components 301 to 305 and 309 to 314 are the same as in FIG. 3.

In addition to the function of the image processing unit 315 of FIG. 3, the image processing unit 1301 can execute the RAW image development processing on the frame data of the RAW image format captured by the image capturing unit 314 at the time of capturing the moving image. Further, it is possible to similarly execute the image development processing for the frame data of the RAW image format decoded from the RAW moving image data by the decoding unit 1303 which will be described later.

In addition to the function of the encoding unit 316 in FIG. 3, the encoding unit 1302 performs predetermined encoding processing on a series of frame data in the RAW image format to generate moving image data. The encoding unit 1302 may also perform encoding processing on the series of frame data on which the image development processing has been executed by the image processing unit 1301 to generate moving image data. The moving image data generated by the encoding unit 1302 can be stored in the storage unit 304.

In the present embodiment, moving image data comprised of the frame data in the RAW image format is referred to as "RAW moving image data", and moving image data comprised of the frame data on which the image development processing has been executed is referred to as "developed moving image data".

The decoding unit 1303 has a function of decoding the RAW moving image data and the developed moving image data stored in the storage unit 304, and acquiring each frame data of the moving image. The frame data in the case of decoding the RAW moving image data becomes the frame data in the RAW image format, and the frame data in the case of decoding the developed moving image data becomes the frame data on which the image development processing has been executed.

The display unit 1304 includes a monitor and a controller including a liquid crystal panel or an organic panel. In the case of displaying a live view image captured by the digital camera 102 on the display unit 1304, the control unit 301 transfers the image data read from the image capturing unit 314 to the image processing unit 1301, and controls so as to sequentially transfer the image data to the display unit 1304 after the image development processing is executed. In the case of displaying the RAW moving image data stored in the storage unit 304 on the display unit 1304, the control unit 301 transfers the RAW moving image data stored in the storage unit 304 to the decoding unit 1303, and controls the image processing unit 1301 to execute the image development processing on the decoded RAW image format frame data and then transfer the decoded frame data to the display unit 1304. Further, In the case of displaying the developed moving image data stored in the storage unit 304 on the display unit 1304, the control unit 301 transfers the developed moving image data stored in the storage unit 304 to the decoding unit 1303, and controls so as to transfer the decoded developed RAW frame data to the display unit 1304.

The image output unit 1305 has a function of outputting the moving image data to an external display (for example, a monitor device or a television device) that is not shown. The image output unit 1305 includes an interface such as a HDMI® connector or a DisplayPort® connector, and a controller. In the case of displaying a live view image captured by the digital camera 102 on the external display, the control unit 301 performs control to transfer image data read from the image capturing unit 314 to the image processing unit 1301, and transfer the image data to the image output unit 1305 after executing the image development processing. In the case of displaying the RAW moving image data stored in the storage unit 304 on the external display, the control unit 301 performs control to transfer the RAW moving image data stored in the storage unit 304 to the decoding unit 1303, and transfer the decoded RAW image format frame data to the image output unit 1305 after the image development processing is executed by the image processing unit 1301. Further, in the case of displaying the developed moving image data stored in the storage unit 304 on the external display, the control unit 301 performs control to transfer the developed moving image data stored in the storage unit 304 to the decoding unit 1303, and transfer the decoded developed RAW frame data to the image output unit 1305.

Next, the configuration and functions of the server apparatus 103 according to the present embodiment will be described with reference to FIG. 14.

Figure 14:
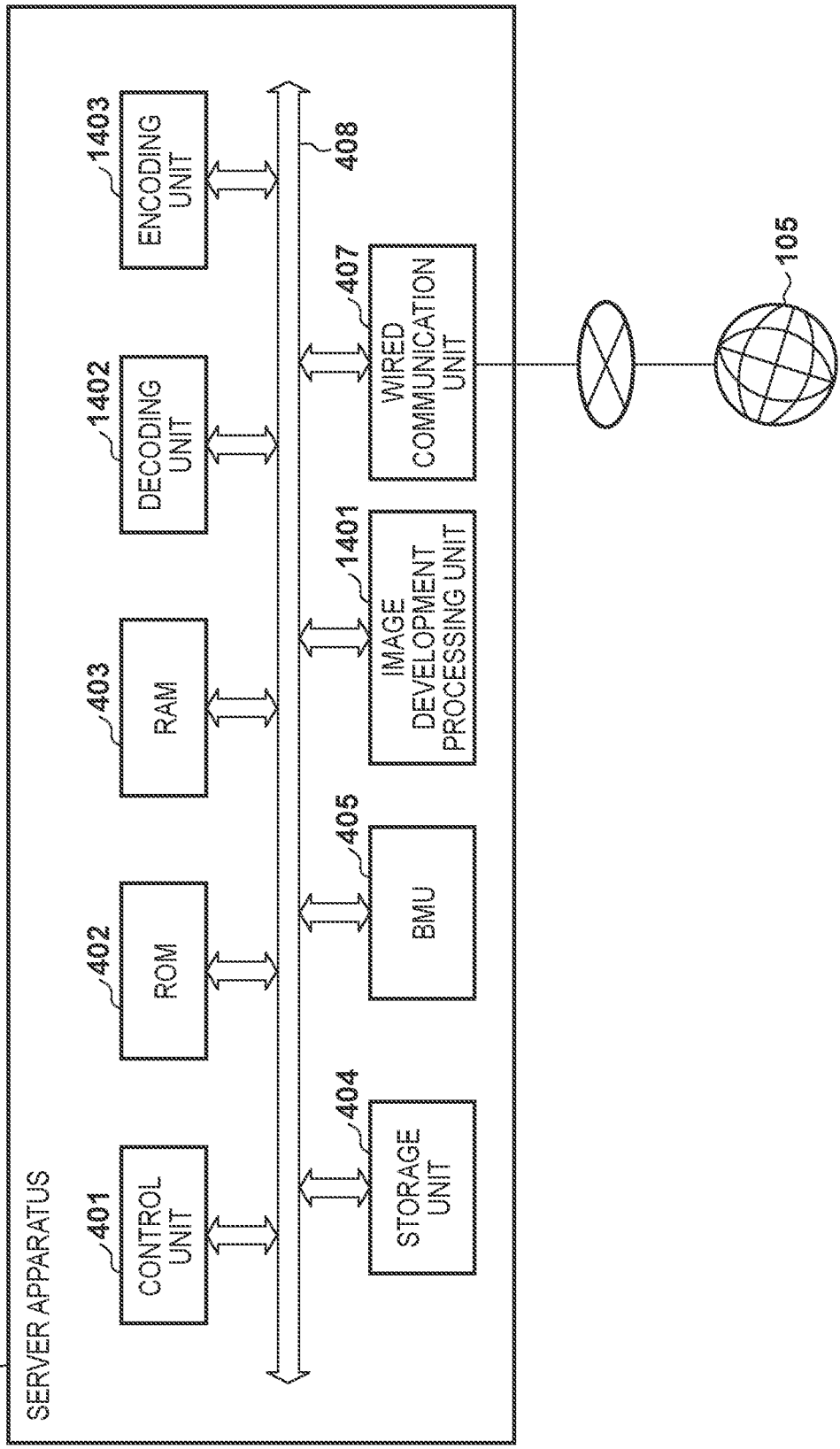
FIG. 14 is a block diagram illustrating a configuration of a server apparatus according to sixth embodiment.

In FIG. 14, the control unit 401, the ROM 402, the RAM 403, the storage unit 404, the BMU 405, the wired communication unit 407, and the bus 408 are the same as those in FIG. 4.

In addition to the function of the image development processing unit 406 of FIG. 4, the image development processing unit 1401 can also execute the image development processing for the frame data in the RAW image format decoded by the decoding unit 1402 that will be described later.

The decoding unit 1402 has a function of decoding the RAW moving image data and the developed moving image data stored in the storage unit 404, and acquiring each frame data of the decoded moving image data. The frame data in the case of decoding the RAW moving image data becomes the frame data in the RAW image format, and the frame data in the case of decoding the developed moving image data becomes the frame data on which the image development processing has been executed.

The encoding unit 1403 performs predetermined encoding processing on a series of the frame data on which the image development processing has been executed by the image development processing unit 1401, generates the developed moving image data, and stores the data in the storage unit 404.

Figure 15B:
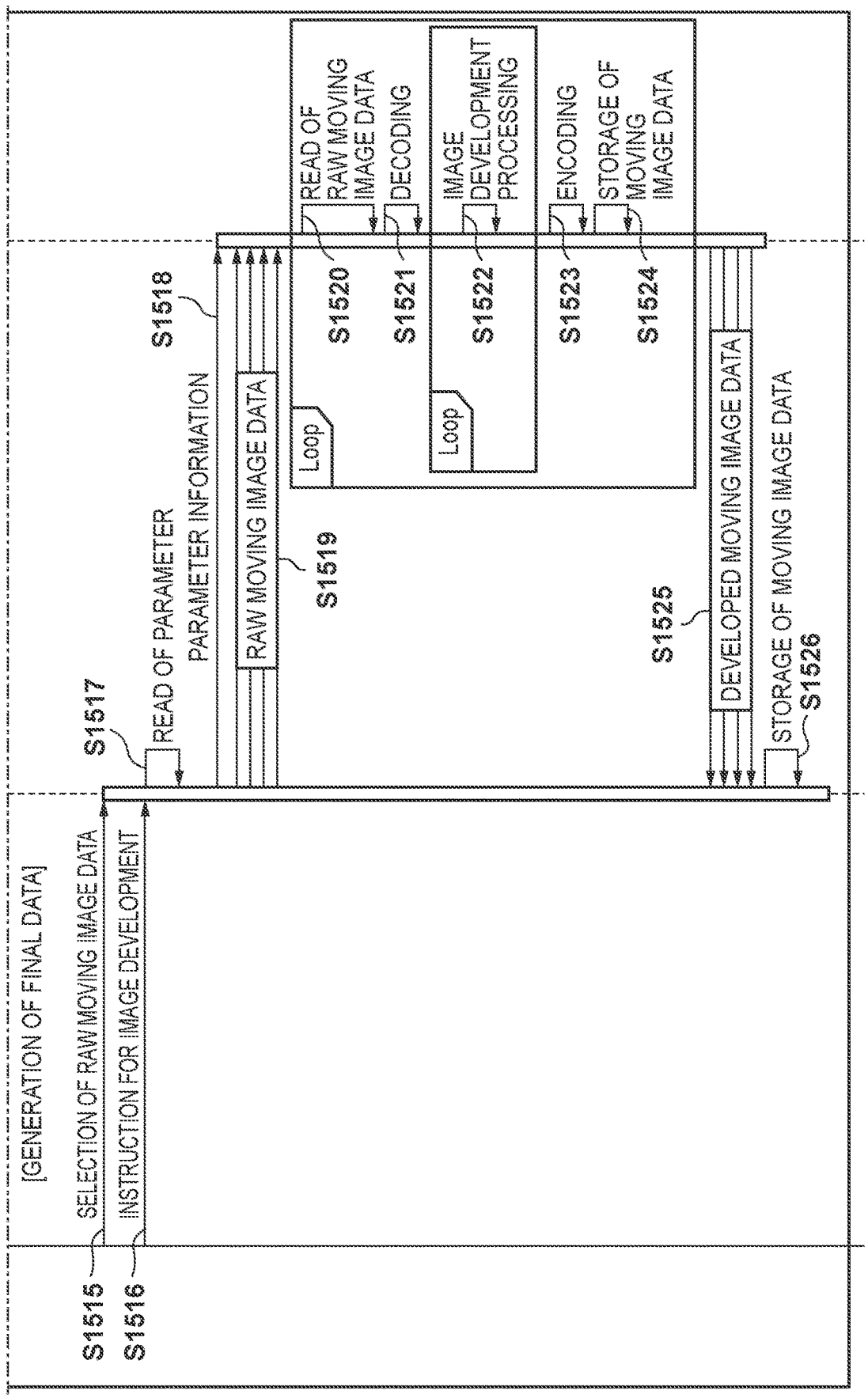

Next, with reference to FIGS. 15A-15B, the operation sequence when the image development processing is executed according to the application of the developed moving image data in the system of the present embodiment will be described.

The processing of steps S1501 to S1505 is the operation in the case of performing image capturing of the RAW moving image data by the digital camera 102.

In step S1501, the digital camera 102 accepts an instruction starting moving image capturing from the user, and starts the moving image capturing. The user can instruct the digital camera 102 to start the moving image capturing by pressing the start/stop button of the moving image capturing provided in the digital camera 102.

In steps S1502 to S1504, the digital camera 102 captures and records the RAW moving image data.

In step S1502, the control unit 301 converts the light incident through the optical system 313 into digital image data in the image capturing unit 314.

The unprocessed data read from the image capturing unit 314 is frame data in the RAW image format, and is stored in the RAM 303. The control unit 301 repeats the processing of step S1502 until a predetermined number of frames of frame data in the RAW image format are stored in the RAM 303.

In step S1503, the control unit 301 transfers the frame data of the plurality of RAW-image formats stored in the RAM 303 in step S1502 to the encoding unit 1302.

The encoding unit 1302 encodes the transferred frame data in the plurality of RAW image formats to generate RAW moving image data. The encoding unit 1302 losslessly compresses frame data in the RAW image format, and constructs data structures in accordance with container formats such as Material eXchange Format (MXF). The encoding unit 1302 stores the generated RAW moving image data in the RAM 303.

In step S1504, the control unit 301 stores the RAW moving image data encoded in step S1503 and stored in the RAM 303 as a file in the storage unit 304. In this case, if the RAW moving image data at the time of the image capturing started in step S1501 has been stored in the storage unit 304, the RAW moving image data generated in step S1503 is added to the RAW moving image data file.

In step S1505, the control unit 301 receives the stop instruction of the moving image capturing by pressing the start/stop button provided in the digital camera 102 again by the user, and stops the moving image capturing.

The processing of steps S1506 to S1526 is the operation when the RAW moving image data stored in the storage unit 304 is used. In the present embodiment, a case where the developed moving image data in which the image development processing has been executed on the RAW moving image data is used for checking the captured content, and a case where the developed moving image data is used for final data such as a delivery, will be described.

The processing of steps S1506 to S1514 is the operation when the developed moving image data in which the RAW image development processing has been executed on the RAW moving image data is used for checking the captured content.

In step S1506, the control unit 301 receives an instruction for selecting the RAW moving image data whose captured content is to be checked from among the RAW moving image data stored in the storage unit 304 by the user. The control unit 301 displays information of the RAW moving image data stored in the storage unit 304 (e.g., captured date and time, file name, and thumbnail image) on the display unit 1304, and the user selects the RAW image data using an operation member or the like provided in the digital camera 102 based on the displayed information. Alternatively, the information of the RAW moving image data stored in the storage unit 304 may be transmitted to the smart device 101 that can communicate with the control unit 301 via the short-range wireless communication unit 309 or the local wireless communication unit 310, and the content selected by the user in the smart device 101 may be acquired.

In step S1507, the control unit 301 receives an instruction for selecting parameters for executing the image development processing on the RAW moving image data selected by the user in step S1506. The selectable parameters are, for example, color LUTs (Look UP Table) and noise reduction intensities. Similar to step S1506, the control unit 301 may display selection items on the display unit 1304 to allow the user to select the parameters, or may perform data communication so as to display the parameters on the application screen of the smart device 101 to allow the user to select the parameters on the smart device 101.

In step S1508, the control unit 301 receives an instruction for reproducing the RAW moving image data selected by the user in step S1506. The reproduction instruction can be realized by pressing a reproduction button provided on the digital camera 102.

In steps S1509 to S1512, the control unit 301 reproduces the RAW moving image data.

In step S1509, the control unit 301 reads a part of the RAW moving image data stored in the storage unit 304 in the RAM 303. In step S1509, by shifting the position of reading the RAW moving image data in accordance with the processing of repeating steps S1509 to S1512, the moving image output in step S1512 that will be described later is sequentially updated, and the RAW moving image data can be viewed as a moving image.

In step S1510, the control unit 301 transfers the data read in step S1509 from the RAM 303 to the decoding unit 1303. The decoding unit 1303 decodes this data to generate the frame data in one or more RAW image formats, and stores the generated frame data in the RAW image format in the RAM 303.

The processing of steps S1511 to S1512 is the processing of each frame data stored in the RAM 303 in step S1510.

In step S1511, the control unit 301 supplies the frame data of the RAW image format stored in the RAM 303 and the parameters for the RAW image development processing selected in step S1507 to the image processing unit 1301, and performs the RAW image development processing for the frame data. The image processing unit 1301 stores the frame data generated by the RAW image development processing in the RAM 303.

In step S1512, the control unit 301 transfers the developed frame data in step S1511 from the RAM 303 to the display unit 1304. The display unit 1304 displays the moving image based on the frame data. Alternatively, in step S1512, the control unit 301 may control the image output unit 1305 to transfer the frame data on which the image development processing has been executed in step S1511 from the RAM 303.

In this case, the image output unit 1305 outputs image signal based on the frame data from the image output unit 1305. The external display displays the image by receiving the image signal output from the image output unit 1305.

By repeating the above-described processing of steps S1509 to S1512, the user can confirm the image developed by the parameters designated in step S1507 with respect to the RAW moving image data selected in step S1506 on the display unit 1304 or the external display.

The repetitive processing of steps S1509 to S1512 is terminated by reading all the RAW moving image data in step S1509 or by the user instruction (pressing of the reproduction button of the digital cameras 102).

The user confirms the image to be output to the display unit 1304 or the external display in the processing of steps S1509 to S1512. If the image has the content (composition, color, etc.) as intended for the image capturing, in step S1513 the control unit 301 sets that the RAW image data selected in step S1506 has been checked using an operation member or the like provided in the digital camera 102.

In step S1514, the control unit 301 stores the combination of the RAW moving image data selected in step S1506 and the RAW image development parameters set in step S1507 in the storage unit 304.

The processing of steps S1515 to S1526 is the processing of using, as final data such as a delivery, the developed moving image data on which the image development processing has been executed on the RAW moving image data.

In step S1515, the control unit 301 receives an instruction for selecting the RAW moving image data to be generated as the final data from among the checked RAW moving image data stored in the storage unit 304 by the user. The control unit 301 displays information of the checked RAW moving image data stored in the storage unit 304 (e.g., captured date and time, file name, thumbnail image) on the display unit 1304, and selects the RAW image data using an operation member or the like provided in the digital camera 102 by viewing the displayed information by the user. Alternatively, the information of the RAW moving image data stored in the storage unit 304 may be transmitted to the smart device 101 that can communicate with the control unit 301 via the short-range wireless communication unit 309 or the local wireless communication unit 310, and the content selected by the user may be acquired by the smart device 101.

In step S1516, the control unit 301 receives an instruction for starting the image development processing for the RAW moving image data selected in step S1515 by the user. In this processing, similar to step S1515, the control unit 301 may display an image development start button or the like on the display unit 1304 so that the user can select the image development start button or the like. Alternatively, the data communication may be performed to display on the application screen of the smart device 101 so that the user can instruct on the smart device 101.

In step S1517, the control unit 301 reads the image development parameters stored in association with the RAW moving image data selected in step S1515 from the storage unit 304. The image development parameters are stored in step S1514.

In step S1518, the control unit 301 transmits the image development parameters read in step S1517 to the server apparatus 103 via the wide area wireless communication unit 311, and requests the server apparatus 103 to execute the image development processing for the RAW moving image data. The control unit 401 of the server apparatus 103 stores the image development parameters and the image development processing request in the storage unit 404 when the image development parameters and the image development processing request are received from the digital camera 102 via the wired communication unit 407.

In step S1519, the control unit 301 transfers the RAW moving image data selected in step S1515 from the digital camera 102 to the server apparatus 103.

This processing is realized by repeating the processing in which the control unit 301 sequentially reads the RAW moving image data stored in the storage unit 304 in the RAM 303 and transmits the RAW moving image data to the server apparatus 103 via the wide area wireless communication unit 311. In the server apparatus 103, the RAW moving image data received via the wired communication unit 407 is stored in the storage unit 404.

In steps S1520 to S1524, in the server apparatus 103, the image development processing for the RAW moving image data is executed in accordance with the image development processing request from the digital camera 102.

In step S1520, the control unit 401 reads a part of the RAW moving image data stored in the storage unit 404 in the RAM 403. In this processing, by shifting the position of reading the RAW moving image data in accordance with the repetitive processing of steps S1520 to S1524, the RAW image development processing of step S1522 is applied to the entire RAW moving image data.

In step S1521, the control unit 401 transfers the data read in step S1520 from the RAM 403 to the decoding unit 1402. The decoding unit 1402 decodes the data to generate the frame data in one or more RAW image formats, and stores the generated frame data in the RAW image format in the RAM 403.

The processing of step S1522 is the processing for the frame data stored in the RAM 403 in step S1521.

In step S1522, the control unit 401 supplies the frame data of the RAW image format stored in RAM 403 and the parameters for the RAW image development processing received in step S1518 to the image development unit 1401, and executes the RAW image development processing for the frame data. The image development processing unit 1401 stores the frame data generated by the image development processing in the RAM 403.

In step S1523, the control unit 401 transfers the developed frame data stored in the RAM 403 in step S1522 to the encoding unit 1403. The encoding unit 1403 encodes the transferred plurality of developed frame data to generate the developed moving image data. The encoding unit 1403 compresses the frame data in accordance with codecs such as H.264, and constructs data structures in accordance with container formats such as MP4 and MOVs.

In step S1524, the control unit 401 stores the developed moving image data encoded in step S1523 and stored in the RAM 403 in the storage unit 404 as a file. In this case, when the developed moving image data corresponding to the RAW moving image data read in step S1520 has already been stored in the storage unit 404, the developed moving image data generated in step S1523 is added to the developed moving image data file.

If the processing of steps S1520 to S1524 is applied to the entire RAW moving image data received in step S1519, the repetitive processing ends.

In step S1525, the control unit 401 transfers, from the server apparatus 103 to the digital camera 102, the developed moving image data generated in steps S1520 to S1524 as a result of the requested image development processing. This processing is realized by repeating the processing in which the control unit 401 sequentially writes the developed moving image data stored in the storage unit 404 to the RAM 403 and transmits the data to the digital camera 102 via the wired communication unit 407.

In step S1526, the control unit 301 stores the developed moving image data received via the wide area wireless communication unit 311 in the storage unit 304.

According to the present embodiment, when the immediacy is required and "checking captured contents" of which the importance of the image quality is relatively low is the purpose of use, the developed moving image data by the image development processing executed by the digital camera 102 in which high-speed processing can be expected is utilized. On the other hand, when the purpose of use is to generate the final data whose image quality is important, the image development request is transmitted to the server apparatus 103, and the developed moving image data by the latest image development processing of the server apparatus 103 is used. In this manner, it is possible to determine whether to request the server apparatus 103 to execute the image development processing according to the application of the developed moving image data.

In the present embodiment, the example in which the final data is generated as the application of the developed moving image data when the image development request to the server apparatus 103 is transmitted has been described, but the present embodiment is not limited to this, and for example, it is also conceivable to generate the developed moving image data for transferring to a specific external apparatus.

In the present embodiment, the moving image data has been described as an example, but the present embodiment is not limited to this, and the RAW image development request for the still image data may also be transmitted to the server apparatus 103 in accordance with the application of the developed moving image data in the same way as the RAW image development request for the moving image data.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-004670, filed Jan. 15, 2020 which is hereby incorporated by reference herein in its entireties.

What is claimed is:

1. An image processing apparatus comprising:
   one or more processors or circuitry that cause the apparatus to operate as:
   a communication unit configured to communicate with an external apparatus;
   an image processing unit configured to perform first image processing on first image data; and
   a control unit configured to transmit a request for executing second image processing which is different from the first image processing on the first image data to the external apparatus via the communication unit, and receive second image data on which the second image processing has been executed from the external apparatus via the communication unit,
   wherein in response that a function of the second image processing executable in the external apparatus is updated, the control unit determines whether to transmit a request again for executing the second image processing to the external apparatus,
   wherein the control unit determines whether or not the function of the second image processing is updated based on information on the function of the second image processing executable in the external apparatus acquired from the external apparatus by the communication unit,
   if the control unit determines that the function of the second image processing is updated, the control unit determines that the request again for executing the second image processing is made,
   wherein the communication unit, the image processing unit, and the control unit are implemented by the one or more processor.

2. The apparatus according to claim 1, wherein if the control unit determines that the request again for executing the second image processing is made to the external apparatus, the control unit selects image data adapted to the updated function of the second image processing from the plurality of first image data.

3. The apparatus according to claim 2, wherein the image data to be subjected to the request again for executing the second image processing is the image data on which the second image processing has already been executed in the external apparatus.

4. The apparatus according to claim 1, wherein the first image processing includes at least one of a noise reduction function, an exposure compensation function, a lens compensation function, an HDR (High Dynamic Range) function, a contrast adjustment function, a sharpness adjustment function, and a saturation adjustment function in image development processing.

5. The apparatus according to claim 1, wherein the control unit does not transmit the first image data to be subjected to the second image processing to the external apparatus in response to the request again when the external apparatus holds the first image data to be subjected to the second image processing when the request again is made to the external apparatus.

6. The apparatus according to claim 1, wherein the first image processing and the second image processing are image development processing,
the second image processing has more advanced functions than the first image processing.

7. The apparatus according to claim 1, wherein the first image data is RAW image data of a still image or a moving image.

8. The apparatus according to claim 1, wherein the image processing apparatus is an image capture apparatus that generates RAW image data, and the external apparatus is a server apparatus.

9. The apparatus according to claim 1, wherein the image processing apparatus is an image capture apparatus that generates RAW image data, and the external apparatus is an information processing apparatus owned by a user.

10. The apparatus according to claim 1, wherein the image processing apparatus is an image capture apparatus that generates RAW image data, and the external apparatus is a server apparatus,
the image capture apparatus communicates with an information processing apparatus owned by a user, and the information processing apparatus communicates with the server apparatus.

11. The apparatus according to claim 10, wherein the information processing apparatus updates an image development function with an update file received from the server apparatus.

12. An image processing apparatus comprising:
one or more processors or circuitry that cause the apparatus to operate as:
a communication unit configured to communicate with an external apparatus;
an image processing unit configured to perform first image processing on first image data;
a display unit configured to display second image data;
a recording unit configured to record the second image data; and
a control unit configured to transmit a request for executing second image processing which is different from the first image processing on the first image data to the external apparatus via the communication unit, and receives second image data on which the second image processing has been executed from the external apparatus via the communication unit,
wherein the control unit determines whether to transmit a request again for executing the second image processing to the external apparatus in accordance with an application of the second image data on which the second image processing has been executed,
wherein the application of the second image data includes any of an application to be displayed on the display unit, an application to be recorded in the recording unit, and an application to be output to the outside via the communication unit,
wherein the communication unit, the image processing unit, the recording unit, and the control unit are implemented by the one or more processor.

13. A method of controlling an image processing apparatus comprising one or more processors or circuitry that cause the apparatus to operate as a communication unit configured to communicate with an external apparatus and an image processing unit configured to perform first image processing on first image data, the method comprising:
transmitting a request for executing second image processing on the first image data which is different from the first image processing to the external apparatus via the communication unit; receiving from the external apparatus second image data on which the second image processing has been executed via the communication unit;
determining whether or not the function of the second image processing is updated based on information on the function of the second image processing executable in the external apparatus acquired from the external apparatus, and
in response that a function of the second image processing executable in the external apparatus is updated, determining whether to transmit a request again for executing the second image processing to the external apparatus.

14. A non-transitory computer-readable storage medium storing a computer program for causing a computer to execute a method of controlling an image processing apparatus, the computer program or circuitry causing the apparatus to operate as a communication unit configured to communicate with an external apparatus and an image processing unit configured to perform first image processing on first image data, the method comprising:
transmitting a request for executing second image processing on the first image data which is different from the first image processing to the external apparatus via the communication unit; receiving from the external apparatus second image data on which the second image processing has been executed via the communication unit; and
determining whether or not the function of the second image processing is updated based on information on the function of the second image processing executable in the external apparatus acquired from the external apparatus, and
in response that a function of the second image processing executable in the external apparatus is updated, determining whether to transmit a request again for executing the second image processing to the external apparatus.

* * * * *